US011016703B2

(12) United States Patent
Nakanishi

(10) Patent No.: US 11,016,703 B2
(45) Date of Patent: May 25, 2021

(54) MEMORY CONTROLLER, MEMORY SYSTEM, INFORMATION SYSTEM, AND MEMORY CONTROL METHOD

(71) Applicant: SONY CORPORATION, Tokyo (JP)

(72) Inventor: Kenichi Nakanishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 218 days.

(21) Appl. No.: 16/325,866

(22) PCT Filed: Jul. 27, 2017

(86) PCT No.: PCT/JP2017/027150
§ 371 (c)(1),
(2) Date: Feb. 15, 2019

(87) PCT Pub. No.: WO2018/051647
PCT Pub. Date: Mar. 22, 2018

(65) Prior Publication Data
US 2019/0205065 A1 Jul. 4, 2019

(30) Foreign Application Priority Data
Sep. 16, 2016 (JP) .............................. JP2016-181107

(51) Int. Cl.
G06F 11/07 (2006.01)
G06F 12/16 (2006.01)
(Continued)

(52) U.S. Cl.
CPC .......... G06F 3/0659 (2013.01); G06F 3/0619 (2013.01); G06F 3/0658 (2013.01);
(Continued)

(58) Field of Classification Search
CPC ............. G06F 12/00–16; G06F 2212/72–7211
See application file for complete search history.

(56) References Cited

U.S. PATENT DOCUMENTS

2002/0166090 A1* 11/2002 Maeda ................... G11B 20/18
714/746
2007/0226589 A1* 9/2007 Maiyuran ........... G06F 11/1064
714/763
(Continued)

FOREIGN PATENT DOCUMENTS

CN 102194527 A 9/2011
EP 2375330 A1 10/2011
(Continued)

OTHER PUBLICATIONS

International Search Report and Written Opinion of PCT Application No. PCT/JP2017/027150, dated Sep. 19, 2017, 06 pages of ISRWO.

Primary Examiner — Nicholas J Simonetti
(74) Attorney, Agent, or Firm — Chip Law Group

(57) ABSTRACT

A delay due to retry processing with regard to occurrence of a memory write error is suppressed. A sub-region command holding section holds a host command as a sub-region command divided with respect to each access target sub-region. A sub-region address conversion section converts an address of an access target sub-region to an address of a memory regarding a sub-region command. A sub-region command execution section executes a sub-region command whose address has been converted, and accesses a memory. In a case where a write error occurs in a memory regarding a sub-region command, an address conversion management section performs preparation processing of a substitute region for a sub-region command in which the write error has occurred concurrently with execution of another sub-region command in the sub-region command execution section.

10 Claims, 23 Drawing Sheets

(51) Int. Cl.
*G06F 11/20* (2006.01)
*G06F 3/06* (2006.01)
*G06F 12/00* (2006.01)
*G06F 11/10* (2006.01)

(52) U.S. Cl.
CPC .......... *G06F 3/0673* (2013.01); *G06F 11/073* (2013.01); *G06F 11/0793* (2013.01); *G06F 11/1016* (2013.01); *G06F 11/20* (2013.01); *G06F 12/00* (2013.01); *G06F 12/16* (2013.01)

(56) References Cited

U.S. PATENT DOCUMENTS

| | | | | |
|---|---|---|---|---|
| 2008/0123408 | A1* | 5/2008 | Honma | ............... G11C 11/5628 |
| | | | | 365/185.03 |
| 2009/0164704 | A1* | 6/2009 | Kanade | ............... G06F 11/1068 |
| | | | | 711/103 |
| 2011/0214033 | A1 | 9/2011 | Yoshii et al. | |

FOREIGN PATENT DOCUMENTS

| | | |
|---|---|---|
| JP | 2007-328824 A | 12/2007 |
| JP | 2011-180831 A | 9/2011 |
| JP | 2015-043183 A | 3/2015 |
| KR | 10-2011-0099175 A | 9/2011 |
| TW | 201202933 A | 1/2012 |

* cited by examiner

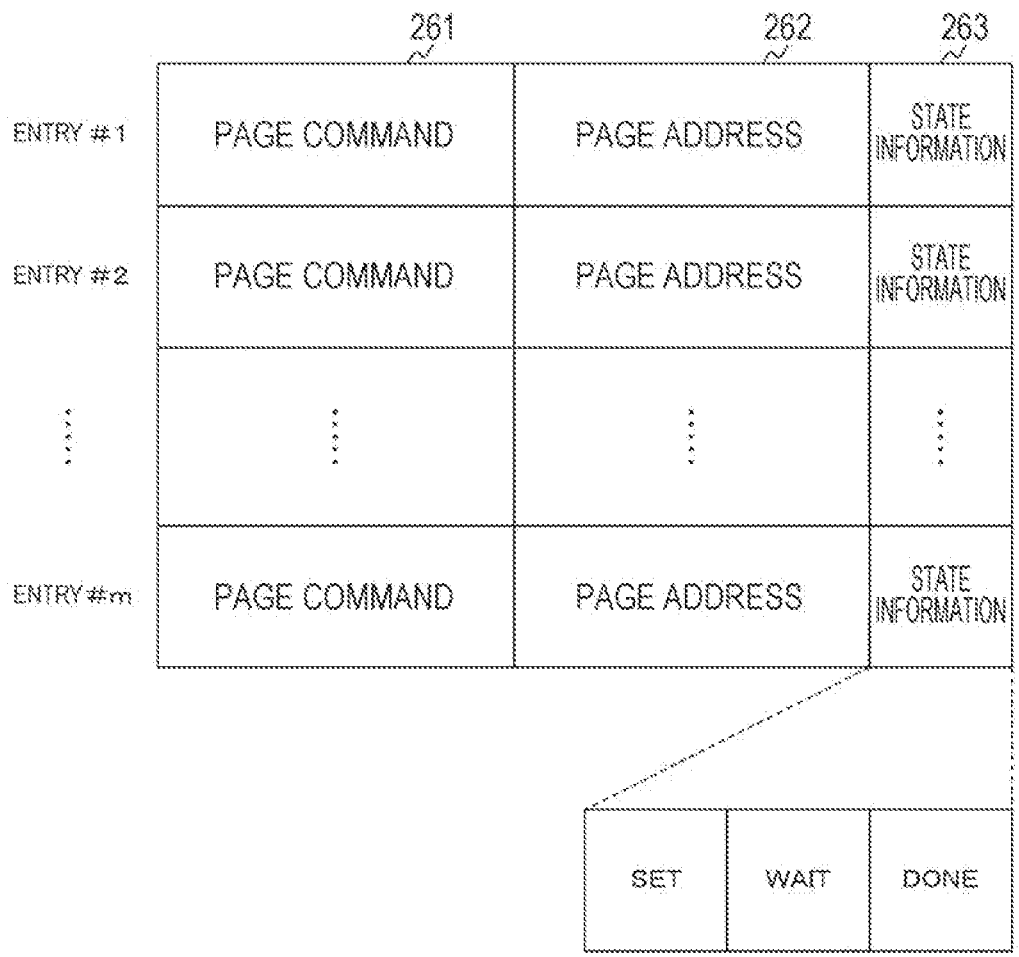
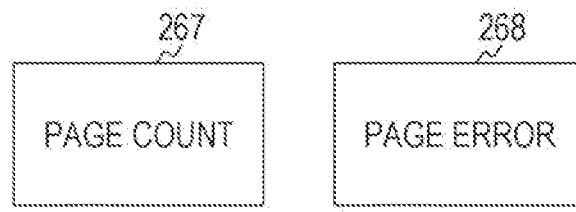
FIG. 5

FIG. 6

| NAME OF STATE | STATE INFORMATION | | |
| --- | --- | --- | --- |
| | SET | WAIT | DONE |
| UNREGISTERED | 1 | 1 | 1 |
| REGISTERED (BEFORE EXECUTION) | 1 | 0 | 0 |
| EXECUTING | 0 | 0 | 0 |
| SUBSTITUTION OCCURRING | 0 | 1 | 0 |
| NORMALLY COMPLETED | 0 | 0 | 1 |
| SUBSTITUTION FAILED (COMPLETION WITH ERROR) | 0 | 1 | 1 |

FIG. 9

SUBSTITUTE ADDRESS CONVERSION TABLE 222

| LOGICAL PAGE ADDRESS #1 | PHYSICAL PAGE ADDRESS #1 |
| --- | --- |
| LOGICAL PAGE ADDRESS #2 | PHYSICAL PAGE ADDRESS #2 |
| ⋮ | ⋮ |
| LOGICAL PAGE ADDRESS #n | PHYSICAL PAGE ADDRESS #n |

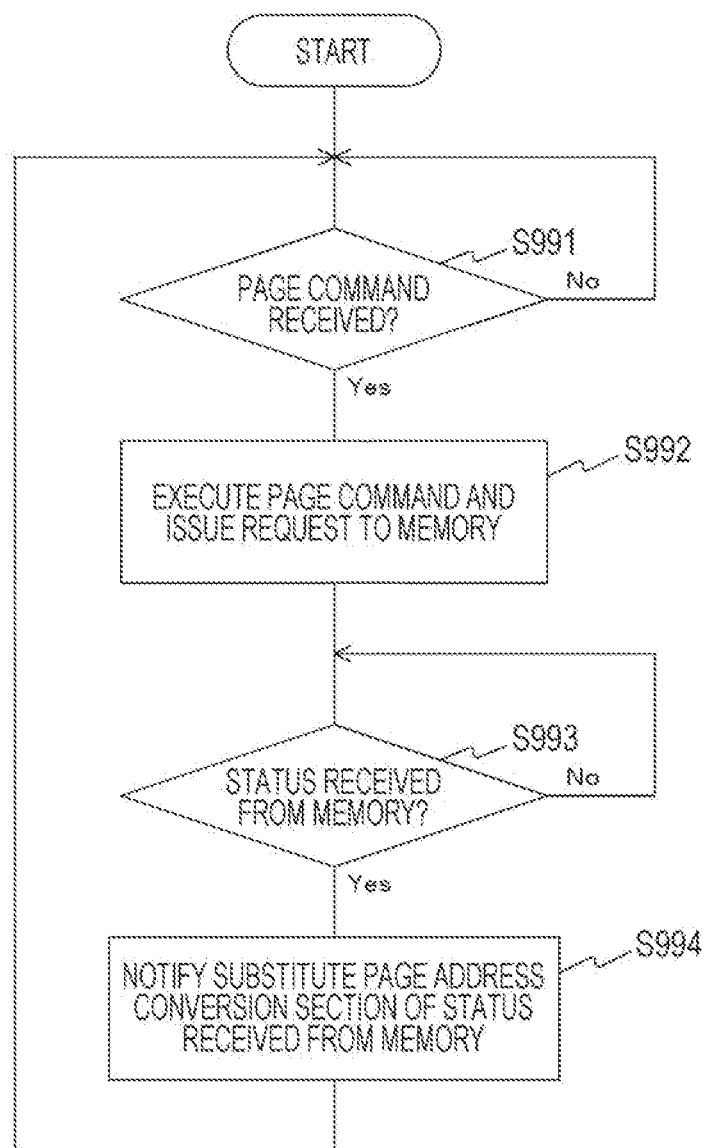

MEMORY CONTROLLER, MEMORY SYSTEM, INFORMATION SYSTEM, AND MEMORY CONTROL METHOD

CROSS REFERENCE TO RELATED APPLICATIONS

This application is a U.S. National Phase of International Patent Application No. PCT/JP2017/027150 filed on Jul. 27, 2017, which claims priority benefit of Japanese Patent Application No. JP 2016-181107 filed in the Japan Patent Office on Sep. 16, 2016. Each of the above-referenced applications is hereby incorporated herein by reference in its entirety.

TECHNICAL FIELD

The present technology relates to a memory controller for controlling a memory. More specifically, the present technology relates to a memory controller, a memory system, and an information system that perform substitution processing of a memory region in the case of a write error, and a processing method therefor, and a program that causes a computer to execute the method.

BACKGROUND ART

Conventionally, a non-volatile memory, e.g., a NAND flash memory, is configured to be managed in units of predetermined blocks and perform retry processing with respect to a different block in a case where a write error occurs. For example, there has been proposed a memory card in which, regarding a block in which a write error has occurred, a block use management table is updated or recording is made on an error management table such that a defective block is managed (see, for example, Patent Document 1).

CITATION LIST

Patent Document

Patent Document 1: Japanese Patent Application Laid-Open No. 2007-328824

SUMMARY OF THE INVENTION

Problems to be Solved by the Invention

In the aforementioned conventional technology, the table is updated and a substitute block is selected and retried every time a write error occurs. Therefore, there is a problem that another access is delayed until the series of processing is completed.

The present technology has been created in view of such circumstances, and it is an object of the present technology to suppress delay due to retry processing with respect to the occurrence of a memory write error.

Solutions to Problems

The present technology is made to solve the aforementioned problem, and a first aspect includes a memory controller including: a sub-region command holding section that holds a host command issued from a host computer for access to a memory as a sub-region command divided with respect to each access target sub-region; a sub-region address conversion section that converts an address of an access target sub-region to an address of the memory regarding the sub-region command held in the sub-region command holding section; a sub-region command execution section that executes the sub-region command whose address has been converted, and performs access to the memory; and an address conversion management section that performs, in a case where a write error occurs in the memory regarding the sub-region command, preparation processing of a substitute region for the sub-region command in which the write error has occurred concurrently with execution of another sub-region command in the sub-region command execution section, a memory system, an information processing system, and a memory control method therefor. Thus, an operation is provided in which, in a case where a write error occurs in a memory, the preparation processing of a substitute region for a sub-region command in which a write error has occurred is executed concurrently with another sub-region command.

Furthermore, the first aspect may further include a sub-region command transmission section that transmits the sub-region command held in the sub-region command holding section to the sub-region command execution section, in which the sub-region command holding section holds state information indicating a state up to completion of execution regarding the sub-region command, and the sub-region command transmission section transmits the sub-region command to the sub-region command execution section according to the state information. Thus, an operation is provided in which the sub-region command is executed according to the state information.

Furthermore, the first aspect may further include a sub-region counter that counts the number of sub-regions up to execution completion regarding the sub-region command held in the sub-region command holding section, and a host command completion transmission section that transmits completion of the host command to the host computer when the sub-region command of all sub-regions related to the host command are counted by the sub-region counter. Thus, an operation is provided in which when the execution of the sub-region command of all sub-regions related to a host command is completed, a notice of the completion of the host command is given.

Furthermore, the first aspect may further include a sub-region error holding section that holds an error occurrence state regarding the sub-region command held in the sub-region command holding section, in which the host command completion transmission section transmits the error occurrence state held in the sub-region error holding section to the host computer. Thus, an operation is provided in which a notice of the error occurrence state is given.

Furthermore, in the first aspect, the sub-region command holding section may further hold a host command identifier that identifies the host command, the sub-region counter may count the number of sub-regions with respect to each host command identifier, and the host command completion transmission section may transmit completion of the host command to the host computer with respect to each host command identifier. Thus, an operation is provided in which even if a plurality of host commands are mixed, the completion of each host command is transmitted.

Furthermore, the first aspect may further include an address conversion table that holds a correspondence relationship between a logical address of the memory and a physical address in the memory in the host computer, in which the sub-region address conversion section converts an address of the sub-region command from the logical address to the physical address according to the address conversion table. Thus, an operation is provided in which the address conversion is caused to be executed according to the address conversion table.

Furthermore, the first aspect may further include a substitute region management table that holds a use state of a substitute region in the memory, in which the address conversion management section registers an address of an unused substitute region as the physical address in the address conversion table according to the substitute region management table. Thus, an operation is provided in which a new substitute region is provided according to the substitute region management table.

Effects of the Invention

According to the present technology, an excellent effect can be provided in which a delay due to retry processing with respect to the occurrence of a memory write error can be suppressed. Note that the effects described herein are not necessarily limitative, but may be any of effects described in the present disclosure.

BRIEF DESCRIPTION OF DRAWINGS

FIG. 5 is a diagram illustrating a configuration example of a page command queue 260 according to a first embodiment of the present technology.

FIG. 6 is a diagram illustrating an example of a state indicated by state information 263 according to an embodiment of the present technology.

FIG. 9 is a diagram illustrating a configuration example of a substitute address conversion table 222 according to an embodiment of the present technology.

FIG. 17 is a flowchart illustrating an example of a processing sequence of a page command execution section 230 of an embodiment of the present technology.

FIG. 20 is a diagram illustrating a configuration example of a page command queue 260 of a second embodiment of the present technology.

MODE FOR CARRYING OUT THE INVENTION

Aspects for carrying out the present technology (hereinafter, the embodiments) are described below. A description is given in the order described below.

1. First embodiment (example in which one host command is divided into a plurality of page commands)
2. Second embodiment (example in which a plurality of host commands are divided into a plurality of page commands)

1. First Embodiment

[Configuration of Information Processing System]

Figure 1:
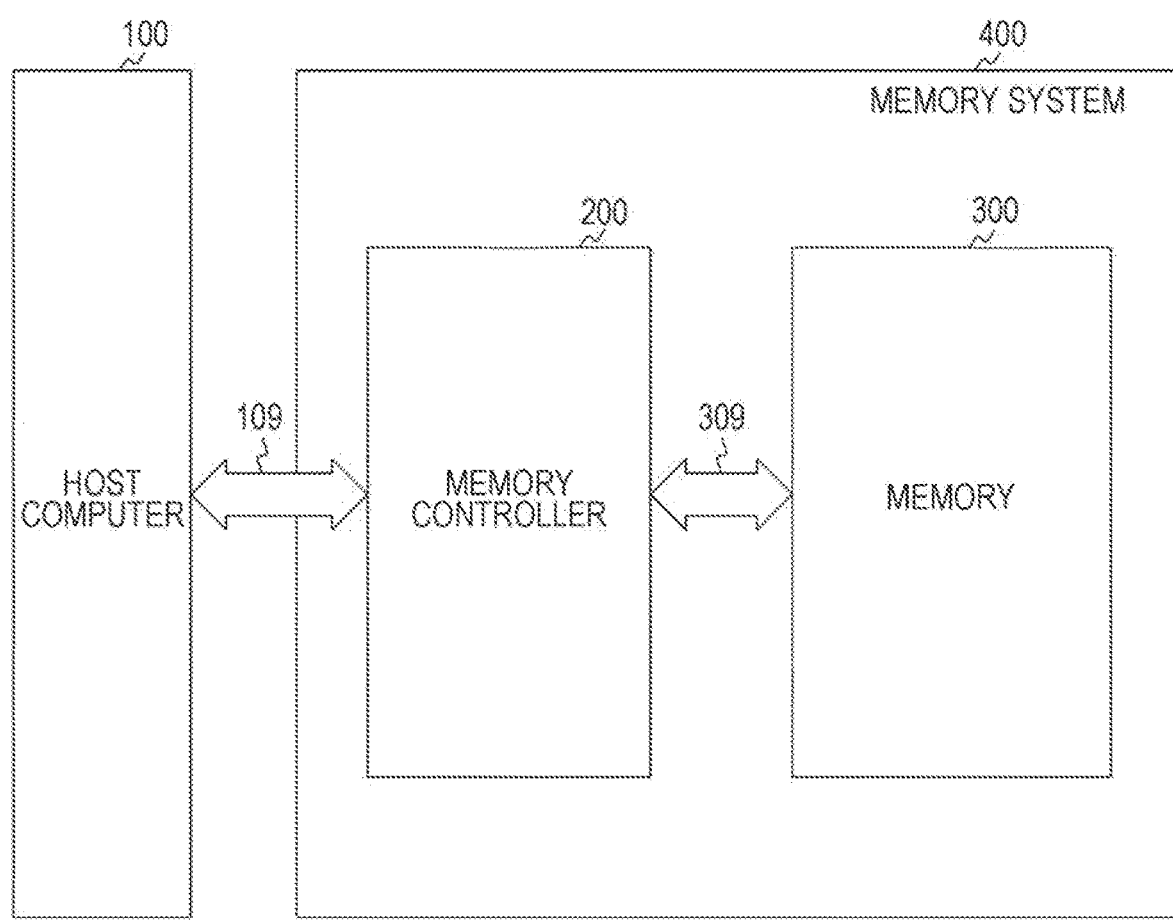
FIG. 1 is a diagram illustrating a configuration example of an information processing system according to an embodiment of the present technology.

FIG. 1 is a diagram illustrating a configuration example of an information processing system according to the embodiment of the present technology. The information processing system includes a host computer 100, a memory controller 200, and a memory 300. The memory controller 200 and the memory 300 configure a memory system 400.

The host computer 100 is to issue a host command that orders read processing, write processing, and the like of data with respect to the memory 300. The host computer 100 includes a processor (not illustrated) that executes processing as the host computer 100 and a controller interface (not illustrated) that performs interactions with the memory controller 200. Furthermore, the host computer 100 generally includes a data buffer. The host computer 100 is connected to the memory controller 200 by a signal line 109.

The memory controller 200 performs request control with respect to the memory 300 according to a host command issued from the host computer 100. The memory controller 200 is connected to the memory 300 by a signal line 309.

The memory 300 includes a control section and a memory cell array (not illustrated). The control section of the memory 300 accesses a memory cell according to a request from the memory controller 200. The memory cell array of the memory 300 is a memory cell array including a plurality of memory cells in which a large number of memory cells that store any one of two values with respect to each bit or a large number of memory cells that store any value of multiple values with respect to each of a plurality of bits are aligned in two dimensional form (matrix form). Regarding the memory cell array, a page with a plurality of byte sizes is a read or write access unit, and a non-volatile memory (NVM) in which data can be overwritten without deletion is assumed.

Figure 2:
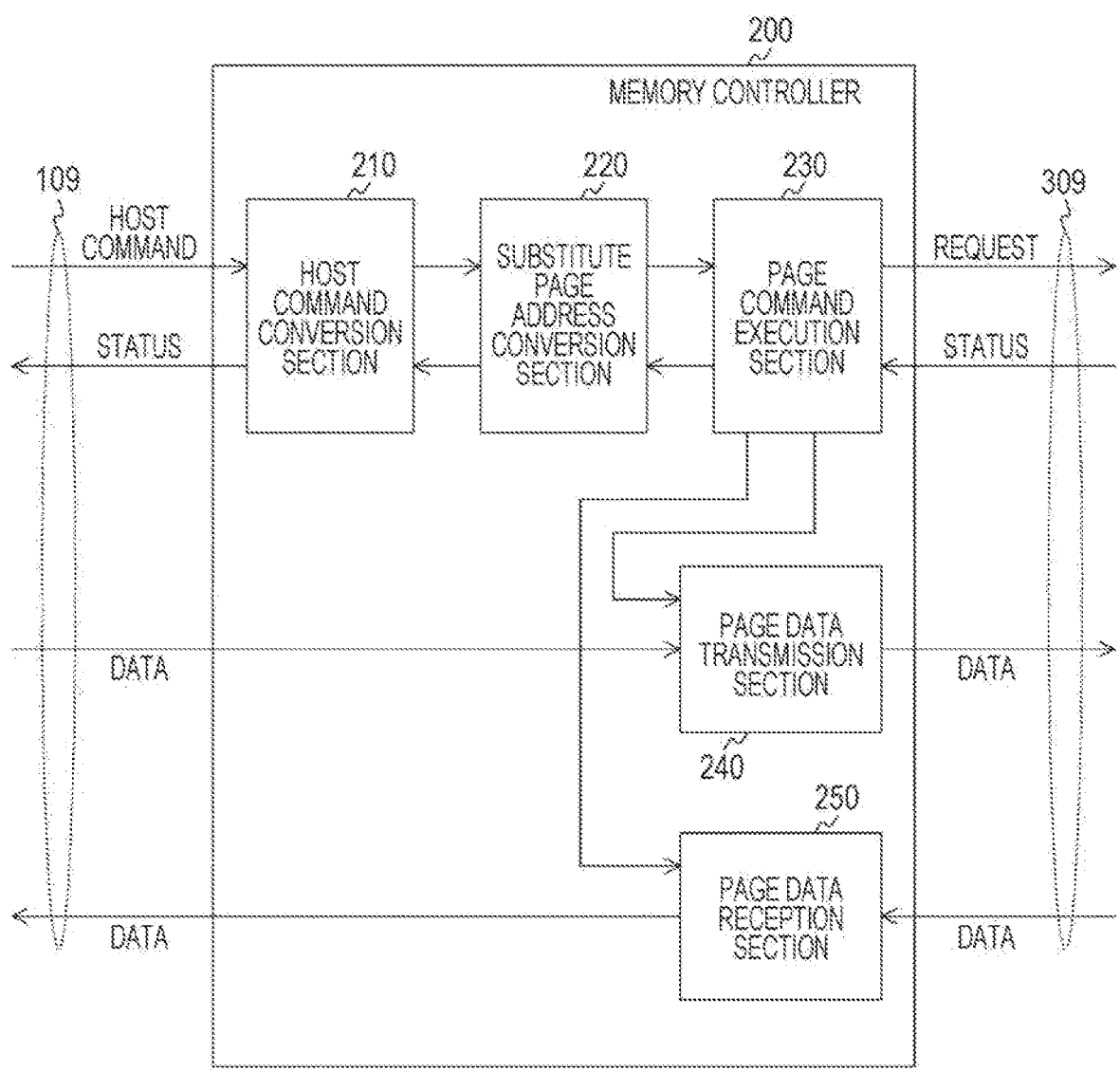
FIG. 2 is a diagram illustrating a configuration example of a memory controller 200 according to an embodiment of the present technology.

FIG. 2 is a diagram illustrating a configuration example of the memory controller 200 according to the embodiment of the present technology. The memory controller 200 includes a host command conversion section 210, a substitute page address conversion section 220, a page command execution section 230, a page data transmission section 240, and a page data reception section 250.

The host command conversion section 210 divides a host command issued from the host computer 100 with respect to each access target page and converts it to a page command. The host command conversion section 210 includes, as described below, a queue for holding the page command in each entry and transmits the page command to the substitute page address conversion section 220 depending on the state of the entry held in the queue. Furthermore, the host command conversion section 210 manages the state of each entry of the queue and, when page commands corresponding to the host command are all completed, notifies the host computer 100 of that effect. Note that the page is a sub-region of the memory 300 and is an example of a sub-region stated in the claims.

The substitute page address conversion section 220 is to convert a logical page address to a physical page address of the memory 300 with regard to a page address of the page command divided by the host command conversion section 210. The substitute page address conversion section 220 includes a table for performing address conversion as described later. Furthermore, the substitute page address conversion section 220, in the case of occurrence of a write error, prepares a substitute page to perform retry processing and performs processing of updating a table for performing address conversion.

The page command execution section 230 is to execute the page command by having the page address having been subjected to the address conversion by the substitute page address conversion section 220 as an access target. The page command execution section 230 issues a request of memory access to the memory 300. Then, the page command execution section 230 receives a status that indicates access results from the memory 300 and notifies the substitute page address conversion section 220 and the host command conversion section 210 of the status. Note that the page command execution section 230 is an example of a sub-region command execution section stated in the claims.

The page data transmission section 240 transmits write data corresponding to a write command issued from the host computer 100, to the memory 300. The host command issued from the host computer 100 is divided in units of pages. Therefore, data transmitted from the page data transmission section 240 to the memory 300 is also page data in units of pages.

The page data reception section 250 receives read data corresponding to a read command issued from the host computer 100, from the memory 300. The host command issued from the host computer 100 is divided in units of pages. Therefore, the data the page data reception section 250 receives from the memory 300 is also page data in units of pages.

Figure 3:
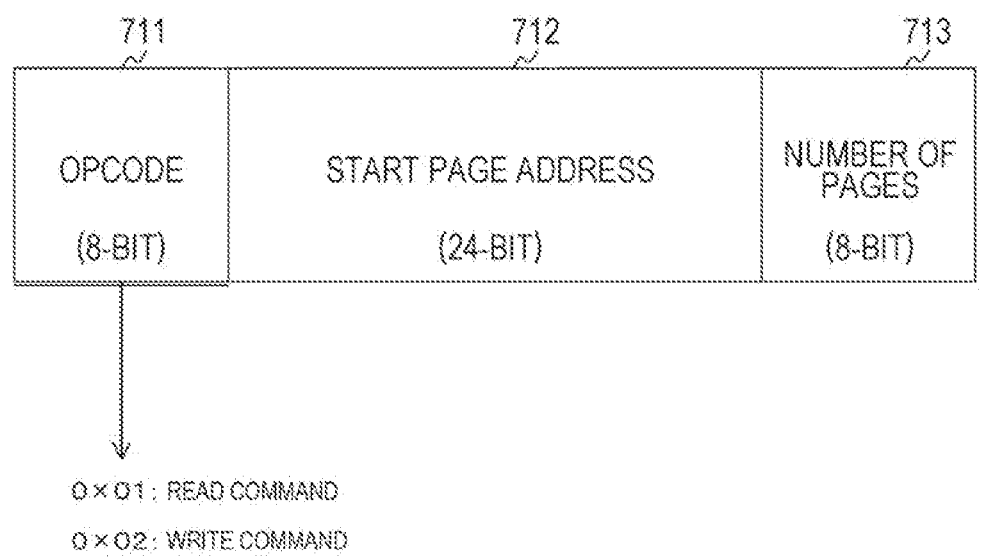
FIG. 3 is a diagram illustrating a field configuration example of a host command issued from a host computer 100 according to a first embodiment of the present technology.

FIG. 3 is a diagram illustrating a field configuration example of the host command issued from the host computer 100 according to the first embodiment of the present technology. The host command includes respective fields of an opcode 711, a start page address 712, and the number of pages 713.

The opcode 711 is a field indicating the type of instructions of the host command, and is herein assumed to be an 8-bit width. The present embodiment focuses on instructions that perform access to the memory 300. In a case where the opcode 711 indicates "0x01", it means a read command for performing reading from the memory 300. Furthermore, in a case where the opcode 711 indicates "0x02", it means a write command for performing writing on the memory 300. Note that the number after "0x" means hexadecimal.

The start page address 712 is a field indicating a page address of a start page in a case where the host command is an instruction for performing access to the memory 300, and is herein assumed to be a 24-bit width. For the host command issued from the host computer 100, a logical address is used as the start page address 712.

The number of pages 713 is a field indicating the number of pages in a case where the host command is an instruction for performing access to the memory 300, and is herein assumed to be an 8-bit width. From among pages indicated by the start page address 712, access is performed for the number of pages indicated by the number of pages 713.

Figure 4:
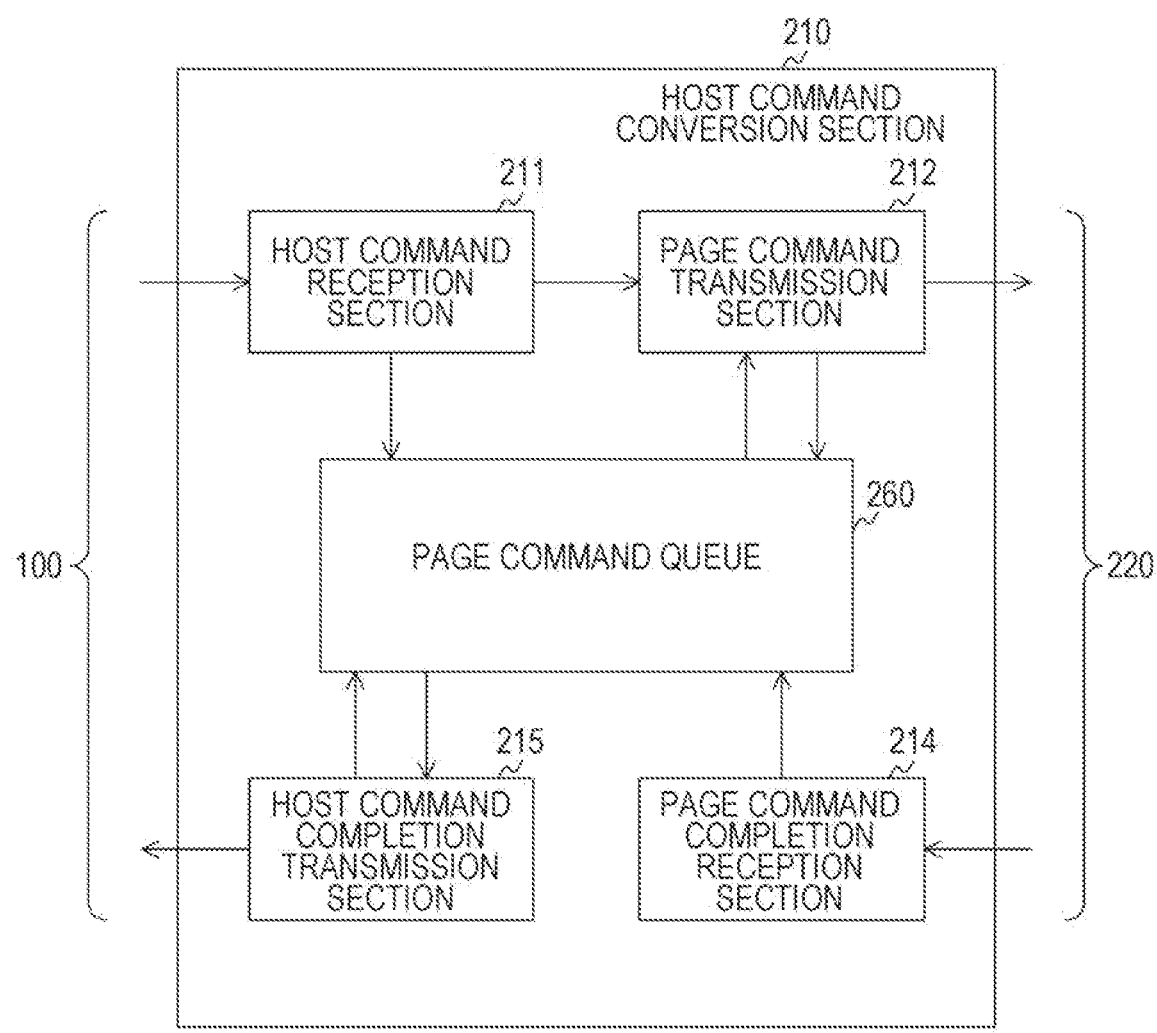
FIG. 4 is a diagram illustrating a configuration example of a host command conversion section 210 according to an embodiment of the present technology.

FIG. 4 is a diagram illustrating a configuration example of the host command conversion section 210 according to the embodiment of the present technology. The host command conversion section 210 includes the page command queue 260, the host command reception section 211, the page command transmission section 212, the page command completion reception section 214, and the host command completion transmission section 215.

The host command reception section 211 receives the host command issued from the host computer 100, divides the host command with respect to each access target page, and converts it to a page command. The page command divided by the host command reception section 211 is held in the page command queue 260.

The page command queue 260 is to hold the page command divided by the host command reception section 211. As described later, the page command queue 260 holds the state of each entry, and each section in the host command conversion section 210 operates depending on the state. Note that the page command queue 260 is an example of a sub-region command holding section stated in the claims.

The page command transmission section 212 is to select one of the page commands held in the page command queue 260 and transmits it to the substitute page address conversion section 220. Which page command to select is dependent on the state of each entry. Note that the page command transmission section 212 is an example of a sub-region command transmission section stated in the claims.

The page command completion reception section 214 is to receive processing completion of the page command in the memory 300 and, depending on the status at that time, update the state of the entry held in the page command queue 260.

The host command completion transmission section 215 is to detect completion of the page command and notifies the host computer 100 of that effect regarding the host command whose corresponding page commands have all been completed depending on the state of the entry held in the page command queue 260. Note that the host command completion transmission section 215 is an example of a host command completion transmission section stated in the claims.

FIG. 5 is a diagram illustrating a configuration example of the page command queue 260 according to the first embodiment of the present technology. The page command queue 260 includes m number of entries (m is an integer of two or more), and associates and holds the page command 261, the page address 262, and the state information 263 in each entry.

The page command 261 indicates the command divided with respect to each page by the host command reception section 211 and holds the same command type as the opcode 711 of the host command before division.

The page address 262 is to indicate the page address divided with respect to each page by the host command reception section 211. To the page address 262, page addresses for the number of pages indicated by the number of pages 713 from the page indicated by the start page address 712 of the host command before division are continuously given. However, the entry numbers held are not necessarily continuous, but are managed independently.

The state information 263 indicates the state of a corresponding entry. The state information 263 includes a total of three-bit fields: SET, WAIT, and DONE. The meanings indicated by the above will be described later.

The page command queue 260 further holds a page count 267 for counting the number of pages and a page error 268 for counting the number of page errors with regard to the page command held in the page command queue 260.

The page count 267 is set at the time of reception of a host command by the host command reception section 211 and is subtracted by one by the host command completion transmission section 215 at the time of completion of the page command. When the page count 267 becomes zero, it is determined that all the page commands corresponding to the host command have been completed. Note that the page count 267 is an example of a sub-region counter stated in the claims.

The page error 268 is set to zero by the host command reception section 211 and one page error 268 is added every time a page for which substitution is impossible is detected. In a case where the page error 268 does not indicate zero when all the page commands corresponding to the host command are completed, the host computer 100 is notified of a status of completion with error by the host command completion transmission section 215. Note that the page error 268 is an example of a sub-region error holding section stated in the claims.

FIG. 6 is a diagram illustrating an example of a state indicated by the state information 263 according to the embodiment of the present technology. In the present embodiment, each entry of the page command queue 260 is assumed to be any of six states described below.

An "unregistered" state indicates a state in which a page command is not registered in a corresponding entry of the page command queue 260. At this time, the bits SET, WAIT, and DONE of the state information 263 indicate "1-1-1", respectively.

A "registered (before execution)" state indicates a state in which a page command is registered in a corresponding entry of the page command queue 260 but is not executed yet. At this time, the bits of the state information 263 indicate "1-0-0", respectively.

An "executing" state indicates a state in which a page command registered in a corresponding entry of the page command queue 260 is being executed. At this time, the bits of the state information 263 indicate "0-0-0", respectively.

A "substitution occurring" state indicates a state in which a page command registered in a corresponding entry of the page command queue 260 is executed, and as a result processing for substitution is occurring. In other words, in a case where a write error occurs, it is necessary to newly search an unused page instead of the page to prepare the unused page as a substitute page. This state is provided while the processing for the above is performed. At this time, the bits of the state information 263 indicate "0-1-0", respectively.

A "normally completed" state indicates a state in which a page command registered in a corresponding entry of the page command queue 260 has been completed normally. At this time, the bits of the state information 263 indicate "0-0-1", respectively.

A "substitution failed (completion with error)" state indicates a state in which the processing for substitution was performed with regard to a page command registered in a corresponding entry of the page command queue 260, but the substitution was failed. At this time, the bits of the state information 263 indicate "0-1-1", respectively.

Figure 7:
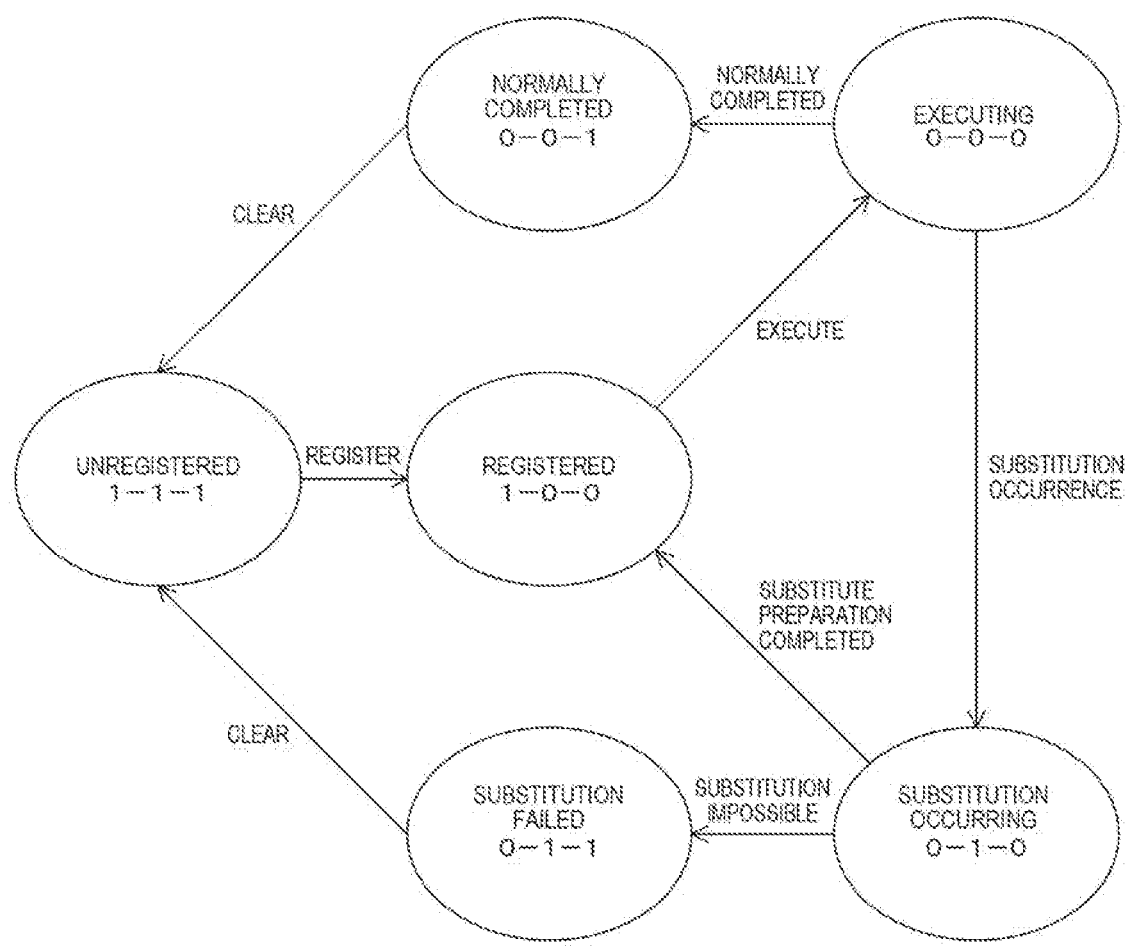
FIG. 7 is a diagram illustrating a transition example of a state indicated by state information 263 according to an embodiment of the present technology.

FIG. 7 is a diagram illustrating a transition example of a state indicated by the state information 263 according to the embodiment of the present technology. The six states in the state transition example are as described above.

An initial state of the entry of the page command queue 260 is in the "unregistered" state. When a page command is newly registered by the host command reception section 211 in the entry in the "unregistered" state, the "registered" state is provided. Then, when the page command in the "registered" state is executed by the page command execution section 230, the "executing" state is provided during execution.

When the page command in the "executing" state is normally completed, the "normally completed" state is provided. Meanwhile, while the processing for substitution is performed as a result of the execution of the page command, the "substitution occurring" state is provided. Then, when the preparation of a substitute page is completed, the "registered" state is again provided, and the page command is to be executed. However, when an unused page cannot be searched and the preparation of a substitute page is failed, the "substitution failed" state is provided.

After the "normally completed" state or "substitution failed" state is provided, the entry is cleared and the "unregistered" state, which is an initial state, is provided.

Figure 8:
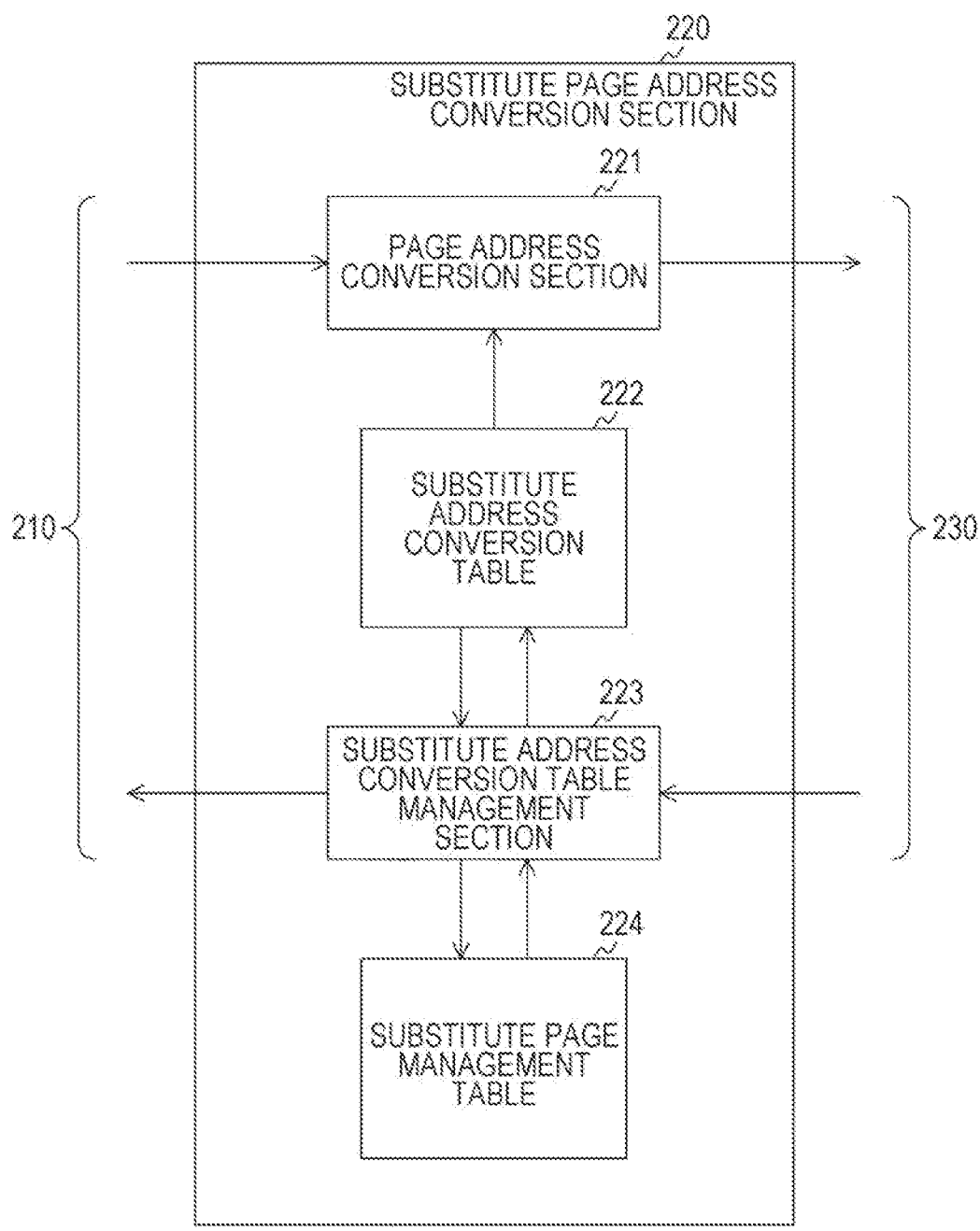
FIG. 8 is a diagram illustrating a configuration example of a substitute page address conversion section 220 according to an embodiment of the present technology.

FIG. 8 is a diagram illustrating a configuration example of the substitute page address conversion section 220 according to the embodiment of the present technology. The substitute page address conversion section 220 includes the page address conversion section 221, the substitute address conversion table 222, the substitute address conversion table management section 223, and the substitute page management table 224.

The page address conversion section 221 is to convert a logical address of an access target page to a physical address of the memory 300 with regard to the page command held in the page command queue 260. Note that the page address conversion section 221 is an example of a sub-region address conversion section stated in the claims.

The substitute address conversion table 222 is a table that holds information for converting the logical address of the host command to a physical address of the memory 300. A configuration example of the substitute address conversion table 222 will be described later. Note that the substitute address conversion table 222 is an example of an address conversion table stated in the claims.

The substitute address conversion table management section 223 is to manage the substitute address conversion table 222. The substitute address conversion table management section 223, in a case where a write error occurs in the memory 300 with regard to the page command, performs preparation processing for a substitute page for a page command in which the write error has occurred. In that case, the substitute address conversion table management section 223 performs the preparation processing for the substitute page concurrently with execution of another page command by the page command execution section 230. Thus, a delay in association with the preparation processing for the substitute page is concealed such that throughput of the memory 300 during retry can be increased. Note that the substitute address conversion table management section 223 is an example of an address conversion management section stated in the claims.

The substitute page management table 224 is a table that holds information for managing a use state of a page, which is used as a substitute page, of the memory 300. A configuration example of the substitute page management table 224 will be described later. Note that the substitute page management table 224 is an example of a substitute region management table stated in the claims.

FIG. 9 is a diagram illustrating a configuration example of the substitute address conversion table 222 according to the embodiment of the present technology. The substitute address conversion table 222 stores a physical page address of the memory 300 with regard to each logical page address of a logical address of the host command.

The page address conversion section 221 can acquire a corresponding physical page address by referring to the substitute address conversion table 222 using the logical page address so as to be capable of converting the logical page address to the physical page address.

Figure 10:
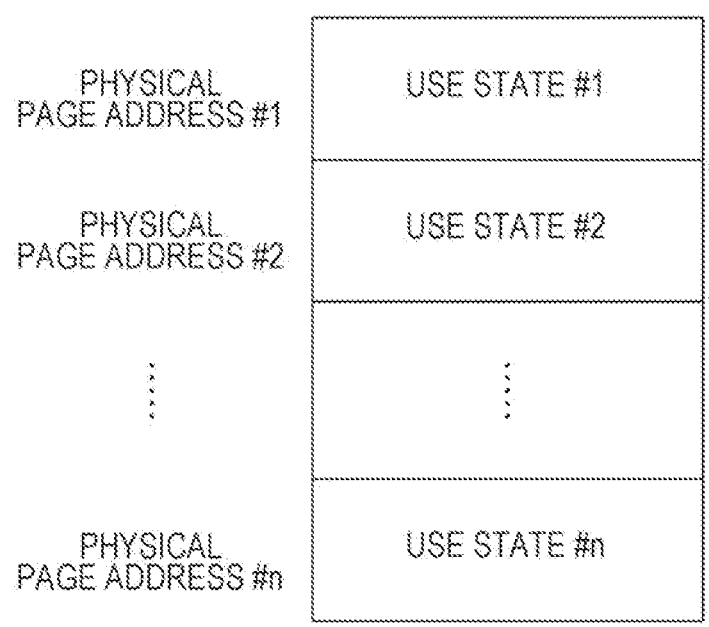
FIG. 10 is a diagram illustrating a configuration example of a substitute page management table 224 according to an embodiment of the present technology.

FIG. 10 is a diagram illustrating a configuration example of the substitute page management table 224 according to the embodiment of the present technology. The substitute page management table 224 stores a use state with regard to each physical page address of the memory 300. The use state indicates, for example, whether or not the page of the memory 300 indicated by the physical page address is already used. In a case of an unused page, the page can newly be used as a substitute page. However, if the page is already used as another logical page, the page cannot be used as a substitute page.

The substitute address conversion table management section 223 searches an unused page as a substitute page by referring to the substitute page management table 224 in the case of write error occurrence and registers a substitution destination page address in the physical page address of the substitute address conversion table 222. Thus, the physical page address corresponding to the logical page address becomes a new substitution destination, and thereafter the new substitution destination page is used as a substitute page.

[Configuration of Information Processing System]

Figure 11:
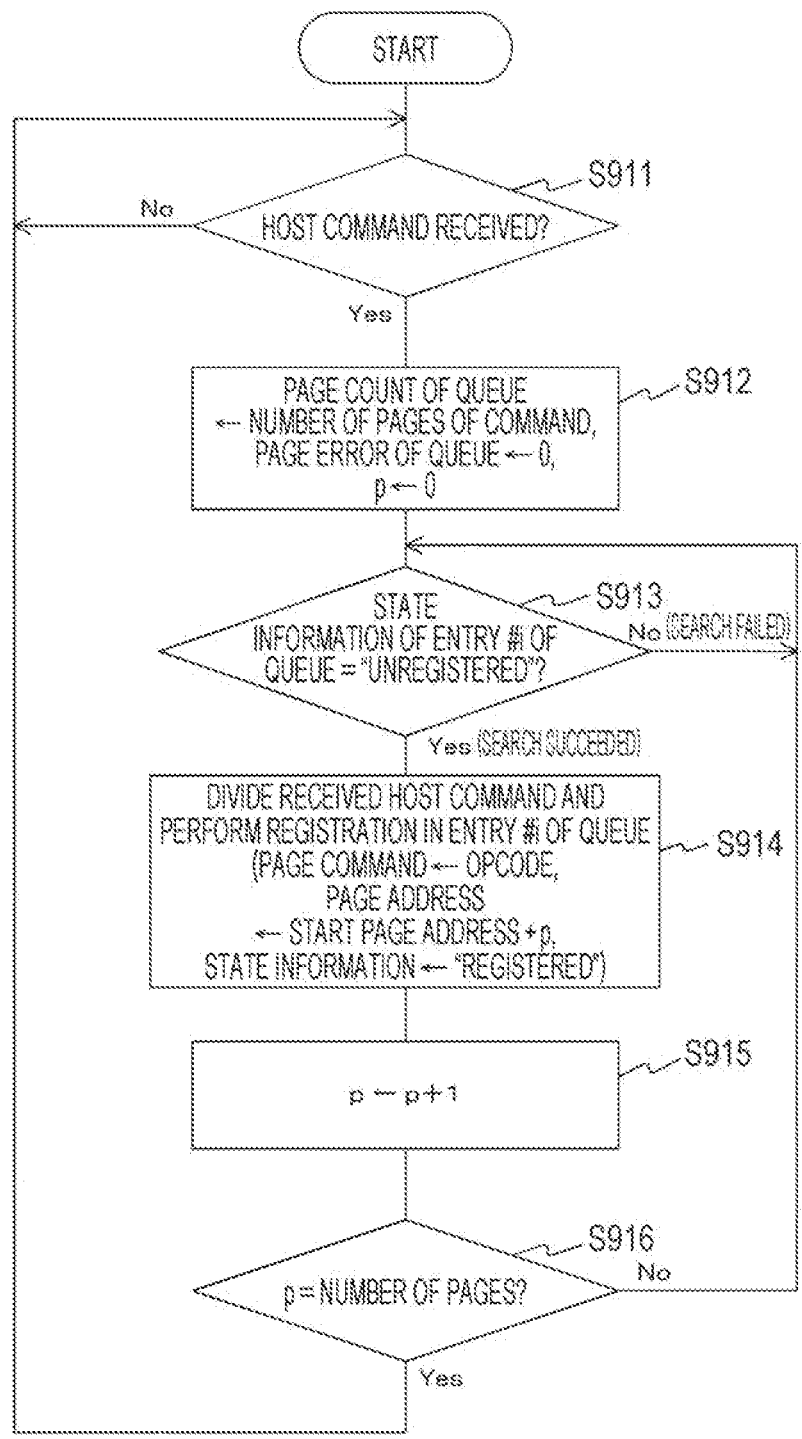
FIG. 11 is a flowchart illustrating an example of a processing sequence of a host command reception section 211 of a first embodiment of the present technology.

FIG. 11 is a flowchart illustrating an example of a processing sequence of the host command reception section 211 of the first embodiment of the present technology.

Upon receiving the host command issued from the host computer 100 (step S911: Yes), the host command reception section 211 sets the number of pages 713 of the host command in the page count 267 of the page command queue 260 (step S912). Furthermore, at this time, the host command reception section 211 sets "0" indicating that a page error has not occurred in the page error 268 of the page command queue 260 (step S912). Furthermore, the host command reception section 211 sets initial value "0" in a control variable p used in the processing below (step S912).

The host command reception section 211 searches an entry in which the state information 263 is in the "unregistered" state in the page command queue 260 (step S913). In a case where an entry in the "unregistered" state could not be searched (step S913: No), waiting is made until the entry in the "unregistered" state can newly be searched.

When entry #i in the "unregistered" state is searched (step S913: Yes), the host command reception section 211 divides a received host command into page commands and registers the page command in entry #i of the page command queue 260 (step S914). In other words, the opcode 711 of the host command is set in the page command 261 of entry #i. Furthermore, a value after the control variable p is added to the start page address 712 of the host command is set in the page address 262 of entry #i. Furthermore, "1-0-0" indicating the "registered" state is set in the state information 263 of entry #i.

When one page command is registered in entry #i of the page command queue 260, the host command reception section 211 adds one to the control variable p (step S915). Then, until the control variable p becomes equal to the number of pages 713 of the host command (step S916: No), the processing from step S913 onwards is repeated. When the control variable p becomes equal to the number of pages 713 of the host command (step S916: Yes), the host command reception section 211 waits for reception of a next host command (step S911).

Figure 12:
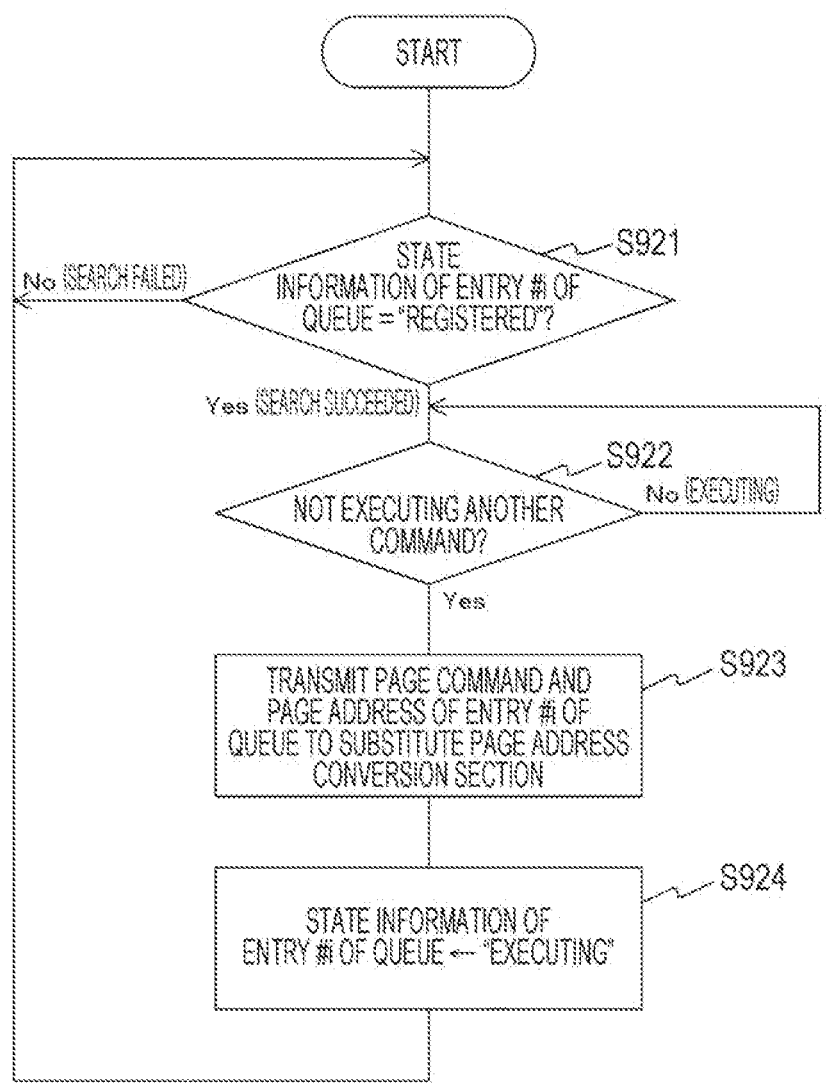
FIG. 12 is a flowchart illustrating an example of a processing sequence of a page command transmission section 212 of an embodiment of the present technology.

FIG. 12 is a flowchart illustrating an example of a processing sequence of the page command transmission section 212 of the embodiment of the present technology.

The page command transmission section 212 searches an entry in which the state information 263 is in the "registered" state in the page command queue 260 (step S921). In a case where the entry in the "registered" state could not be searched (step S921: No), waiting is made until an entry in the "registered" state can newly be searched.

When entry #i in the "registered" state is searched (step S921: Yes), the page command transmission section 212 determines whether or not it is possible to transmit the page command to the substitute page address conversion section 220 (step S922). If the memory 300 executes another command and is in a busy state (step S922: No), the page command transmission section 212 waits until the state is removed.

When the page command can be transmitted (step S922: Yes), the page command transmission section 212 transmits the page command 261 and the page address 262 of entry #i of the page command queue 260 to the substitute page address conversion section 220 (step S923). Then, the page command transmission section 212 sets the state information 263 of entry #i to the "executing" state (step S924).

Thereafter, the page command transmission section 212 repeats the processing from step S921 onwards.

Figure 13:
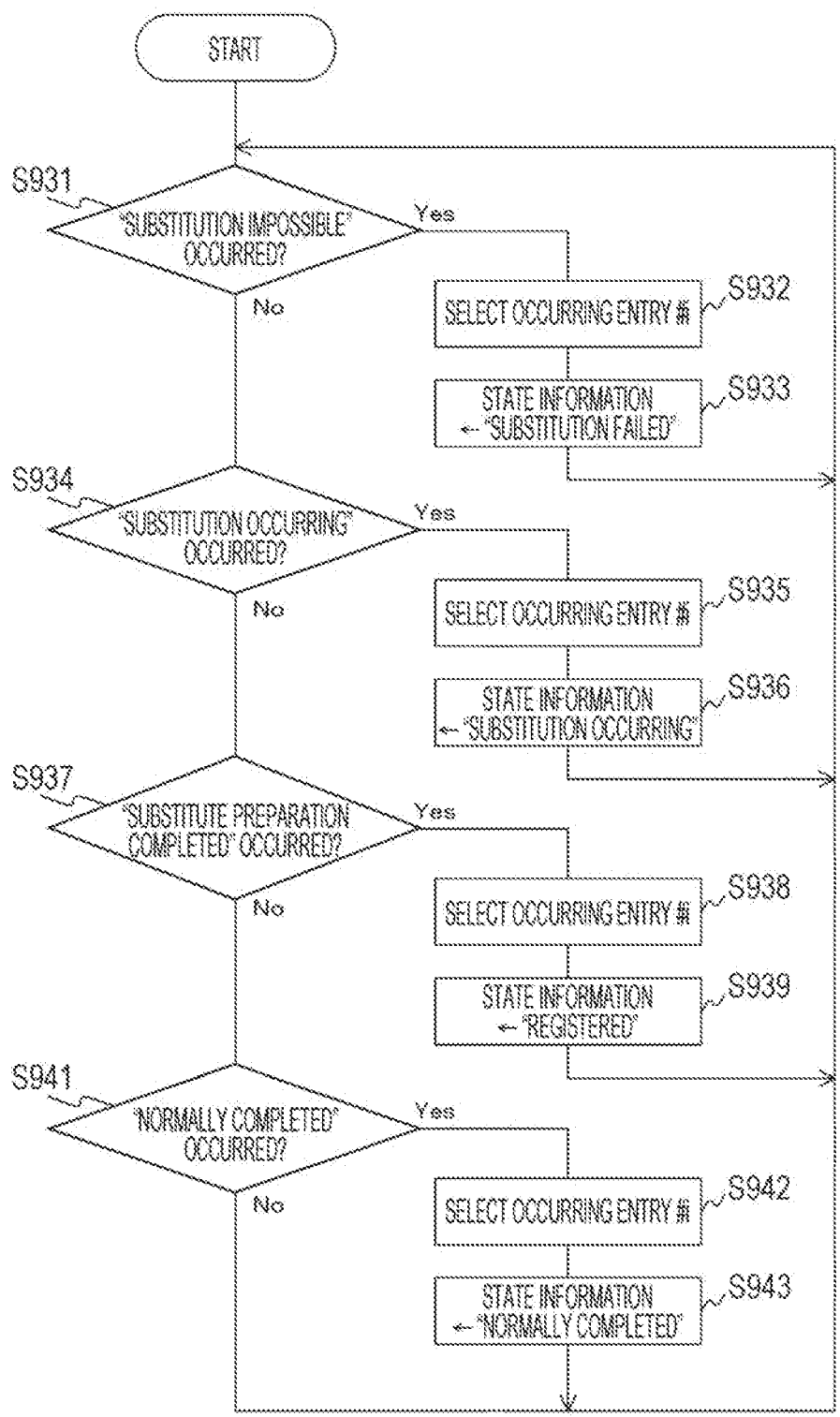
FIG. 13 is a flowchart illustrating an example of a processing sequence of a page command completion reception section 214 of an embodiment of the present technology.

FIG. 13 is a flowchart illustrating an example of a processing sequence of the page command completion reception section 214 of the embodiment of the present technology.

The page command completion reception section 214 receives a status signal from the substitute page address conversion section 220 and updates the state information 263 of the page command queue 260. At this time, when a status signal "substitution impossible" is received (step S931: Yes), entry #i in which the relevant page command is held in the page command queue 260 is selected (step S932). Then, the state information 263 of entry #i is set to "substitution failed" (step S933).

Furthermore, when a status signal "substitution occurring" is received (step S934: Yes), entry #i in which the relevant page command is held in the page command queue 260 is selected (step S935). Then, the state information 263 of entry #i is set to "substitution occurring" (step S936).

Furthermore, when a status signal "substitute preparation completed" is received (step S937: Yes), entry #i in which the relevant page command is held in the page command queue 260 is selected (step S938). Then, the state information 263 of entry #i is set to "registered" (step S939).

Furthermore, when a status signal "normally completed" is received (step S941: Yes), entry #i in which the relevant page command is held in the page command queue 260 is selected (step S942). Then, the state information 263 of entry #i is set to "normally completed" (step S943).

Thereafter, the page command completion reception section 214 repeats the processing from step S931 onwards.

Figure 14:
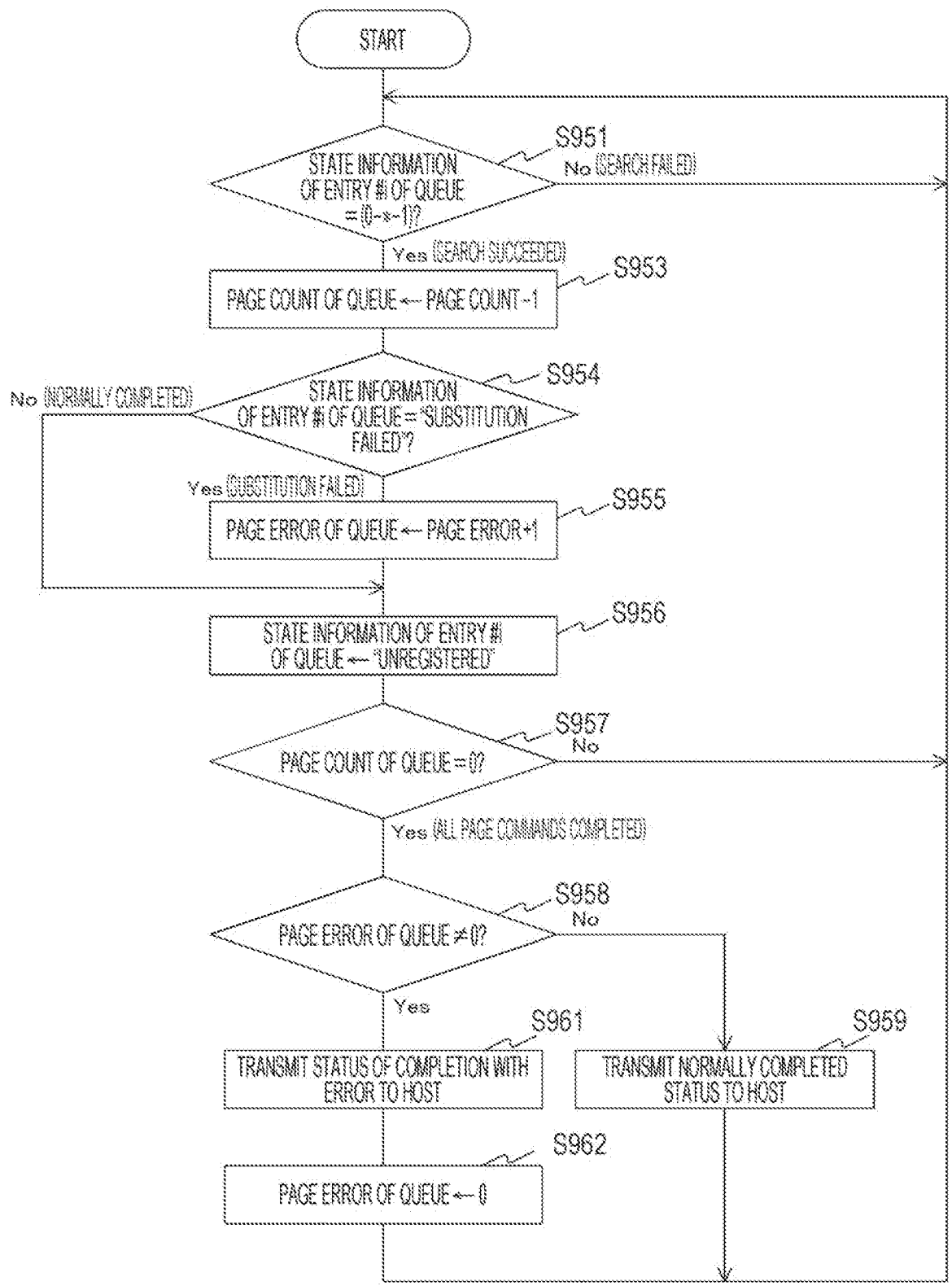
FIG. 14 is a flowchart illustrating an example of a processing sequence of a host command completion transmission section 215 of a first embodiment of the present technology.

FIG. 14 is a flowchart illustrating an example of a processing sequence of the host command completion transmission section 215 of the first embodiment of the present technology.

The host command completion transmission section 215 searches entry #i in which the state information 263 is in the completed state "0-*-1" in the page command queue 260 (step S951). Here, "*" indicates that "*" may be either "0" or "1". In other words, the completed state means one of the "normally completed" state and the "substitution failed" state. In a case where the entry in the completed state could not be searched (step S951: No), waiting is made until an entry in the completed state can newly be searched.

When entry #i in the completed state is searched (step S951: Yes), the host command completion transmission section 215 subtracts one from the page count 267 of the page command queue 260 (step S953). At this time, in a case where the state information 263 of entry #i indicates the "substitution failed" state (step S954: Yes), the host command completion transmission section 215 adds one to the page error 268 of the page command queue 260 (step S955). Then, the host command completion transmission section 215 sets "1-1-1" indicating the "unregistered" state in the state information 263 of entry #i (step S956).

The host command completion transmission section 215 repeats the processing from step S951 onwards when the page count 267 of the page command queue 260 is not "0" (step S957: No). When the page count 267 is "0" (step S957: Yes), the host command completion transmission section 215 performs the processing described below on the basis of the assumption that all the page commands corresponding to the host command have been completed.

At this time, when the page error 268 of the page command queue 260 is "0" (step S958: No), the host command has been normally completed. Therefore, the host command completion transmission section 215 transmits a status signal indicating the normal completion, to the host computer 100 (step S959).

Meanwhile, when the page error 268 of the page command queue 260 is not "0" (step S958: Yes), the host command has been completed with error. Therefore, the host command completion transmission section 215 transmits a status signal indicating completion with error, to the host computer 100 (step S961). Then, in preparation of next processing, the page error 268 of the page command queue 260 is reset to "0" (step S962).

Thereafter, the host command completion transmission section 215 repeats the processing from step S951 onwards.

Figure 15:
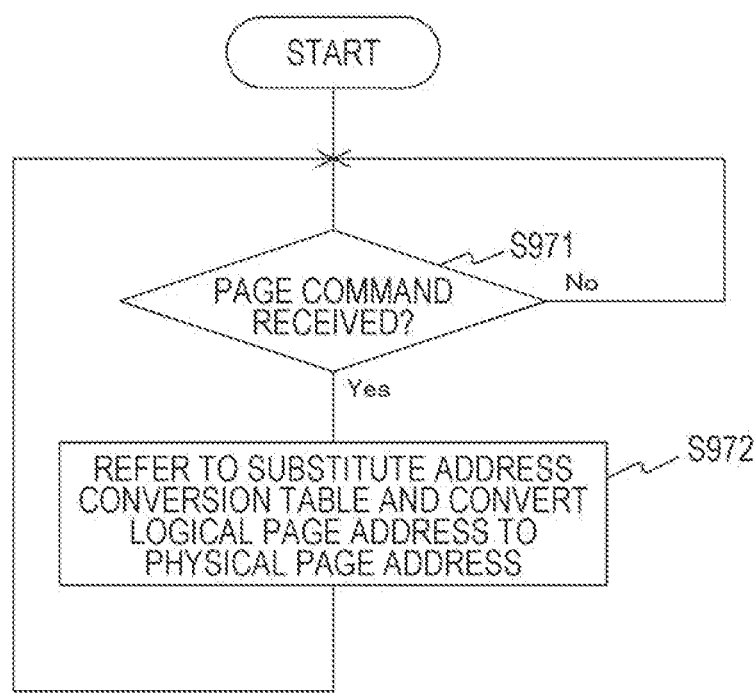
FIG. 15 is a flowchart illustrating an example of a processing sequence of a page address conversion section 221 of an embodiment of the present technology.

FIG. 15 is a flowchart illustrating an example of a processing sequence of the page address conversion section 221 of the embodiment of the present technology.

The page address conversion section 221 performs address conversion upon receiving the page command from the page command transmission section 212 (step S971: Yes). In other words, with reference to the substitute address conversion table 222, the logical address of the page command is converted to a physical address of the memory 300 (step S972). The page address conversion section 221 repeats the processing from step S971 onwards.

Figure 16:
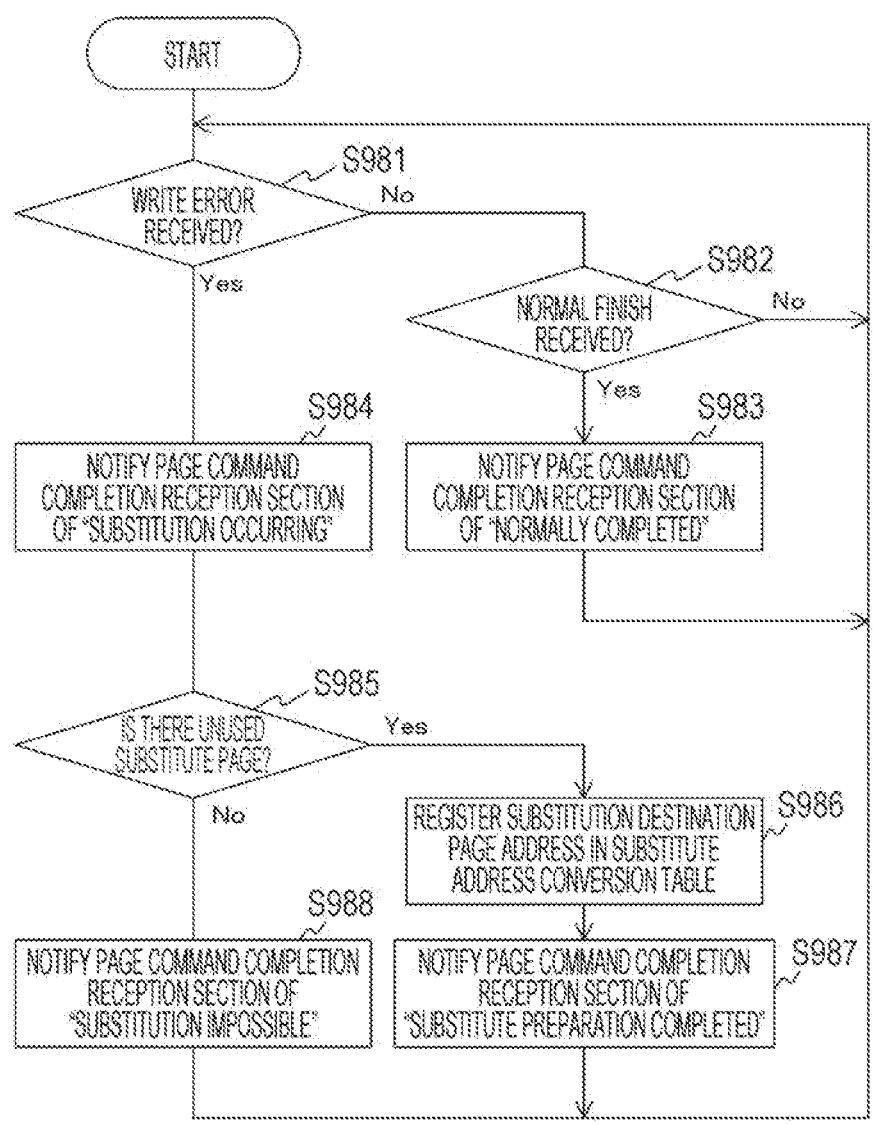
FIG. 16 is a flowchart illustrating an example of a processing sequence of a substitute address conversion table management section 223 of an embodiment of the present technology.

FIG. 16 is a flowchart illustrating an example of a processing sequence of the substitute address conversion table management section 223 of the embodiment of the present technology.

When not receiving a write error from the page command execution section 230 (step S981: No) but receiving normal finish (step S982: Yes), the substitute address conversion table management section 223 notifies the page command completion reception section 214 of normal completion (step S983).

Upon receiving a write error from the page command execution section 230 (step S981: Yes), the substitute address conversion table management section 223 notifies the page command completion reception section 214 of substitution occurring (step S984).

The substitute address conversion table management section 223 refers to the substitute page management table 224 and, in the presence of an unused substitute page (step S985: Yes), registers the page address as a substitution destination in the substitute address conversion table 222 (step S986). Then, the substitute address conversion table management section 223 notifies the page command completion reception section 214 of substitute preparation completion (step S987).

In a case where an unused substitute page is absent (step S985: No), the substitute address conversion table management section 223 notifies the page command completion reception section 214 of substitution being impossible (step S988).

Thereafter, the substitute address conversion table management section 223 repeats the processing from step S981 onwards.

FIG. 17 is a flowchart illustrating an example of a processing sequence of the page command execution section 230 of the embodiment of the present technology.

The page command execution section 230 waits for reception of the page command from the substitute page address conversion section 220 (step S991). Upon receiving the page command (step S991: Yes), the page command execution section 230 issues a request of memory access to the memory 300 depending on the content of the page command (step S992).

Furthermore, upon receiving a status from the memory 300 with respect to the request (step S993: Yes), the page command execution section 230 notifies the substitute page address conversion section 220 of the status (step S994).

Thereafter, the page command execution section 230 repeats the processing from step S991 onwards.

[Effects]

Figure 18A:
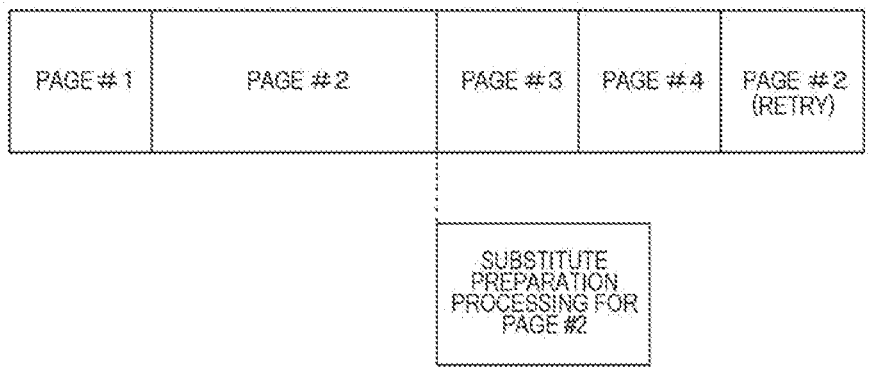
FIGS. 18A and 18B are diagrams illustrating an example of processing timing of an information processing system of a first embodiment of the present technology.
Figure 18B:
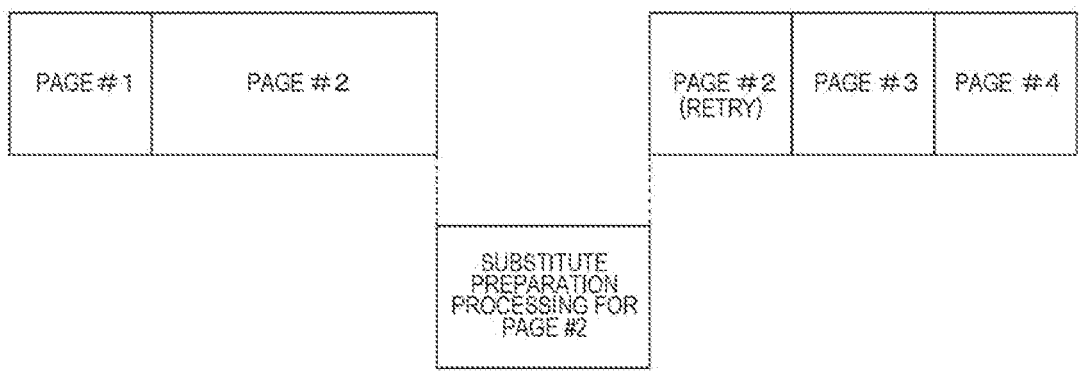

FIGS. 18A and 18B are diagrams illustrating an example of processing timing of the information processing system of the first embodiment of the present technology. In this example, the case is assumed in which when access to the memory 300 is performed in order from page #1, a write error occurs on page #2 and retry is performed on page #2.

In a conventional technology, as illustrated in b of the drawing, retry of page #2 is performed after substitute preparation processing for page #2 and then access to next page #3 is performed continuously.

In the first embodiment, as illustrated in a of the drawing, when a write error occurs regarding page #2, retry of page #2 is not waited, but access to next page #3 is performed. In other words, the next page command is executed concurrently with the substitute preparation processing in which the substitute page management table 224 is referenced, a substitute page is provided, and a substitution destination page address is set in the substitute address conversion table 222. Thus, a delay in association with the preparation processing for the substitute page is concealed such that throughput of the memory 300 during retry can be increased.

In this way, in the first embodiment of the present technology, the host command reception section 211 divides the host command into page commands with respect to each page and access to the memory 300 is performed in units of pages. Then, when a write error occurs, the substitute address conversion table management section 223 performs the preparation processing for the substitute page concurrently with execution of another page command by the page command execution section 230. Thus, a delay in association with the preparation processing for the substitute page is concealed such that throughput of the memory 300 during retry with respect to a write error can be increased.

2. Second Embodiment

In the first embodiment described above, the host command is divided into page commands with respect to each page, and a next host command is processed after completion of all the page commands corresponding to one host command. In contrast, in the second embodiment, page commands corresponding to different host commands are mixedly executed. Thus, an opportunity of hiding a delay in association with the preparation processing for a substitute page is expanded such that throughput of the memory 300 is further increased.

Note that an information processing system of the second embodiment is similar to the configuration of the first embodiment described above, and a detailed description is omitted.

Figure 19:
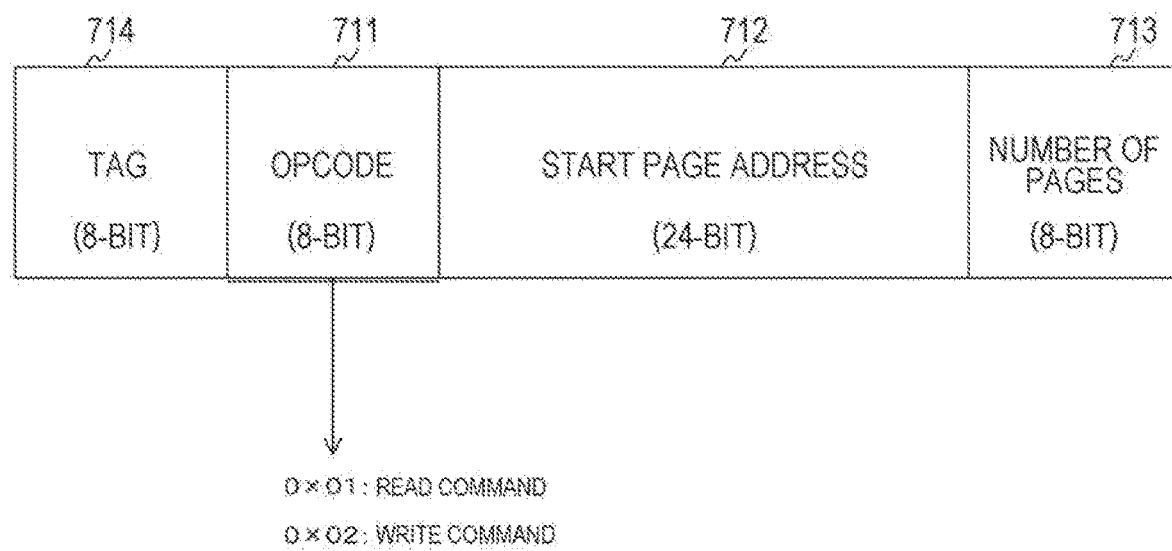
FIG. 19 is a diagram illustrating a field configuration example of a host command issued from a host computer 100 of a second embodiment of the present technology.

FIG. 19 is a diagram illustrating a field configuration example of a host command issued from the host computer 100 of the second embodiment of the present technology.

Similarly to the first embodiment, the host command includes respective fields of the opcode 711, the start page address 712, and the number of pages 713. Then, the host command of the second embodiment further includes a tag 714.

The tag 714 is a host command identifier for identifying the host command and includes a different value with respect to each host command. The host computer 100 assigns the tag 714 when a host command is issued. The host computer 100 manages completion of the host command or data transfer using the tag 714. When the host command is divided into page commands, the tag 714 is given to each of the page commands. The host computer 100 detects the fact that the memory controller 200 has changed the order of execution of the host command, by using the tag 714, and can take a response.

Figure 20:
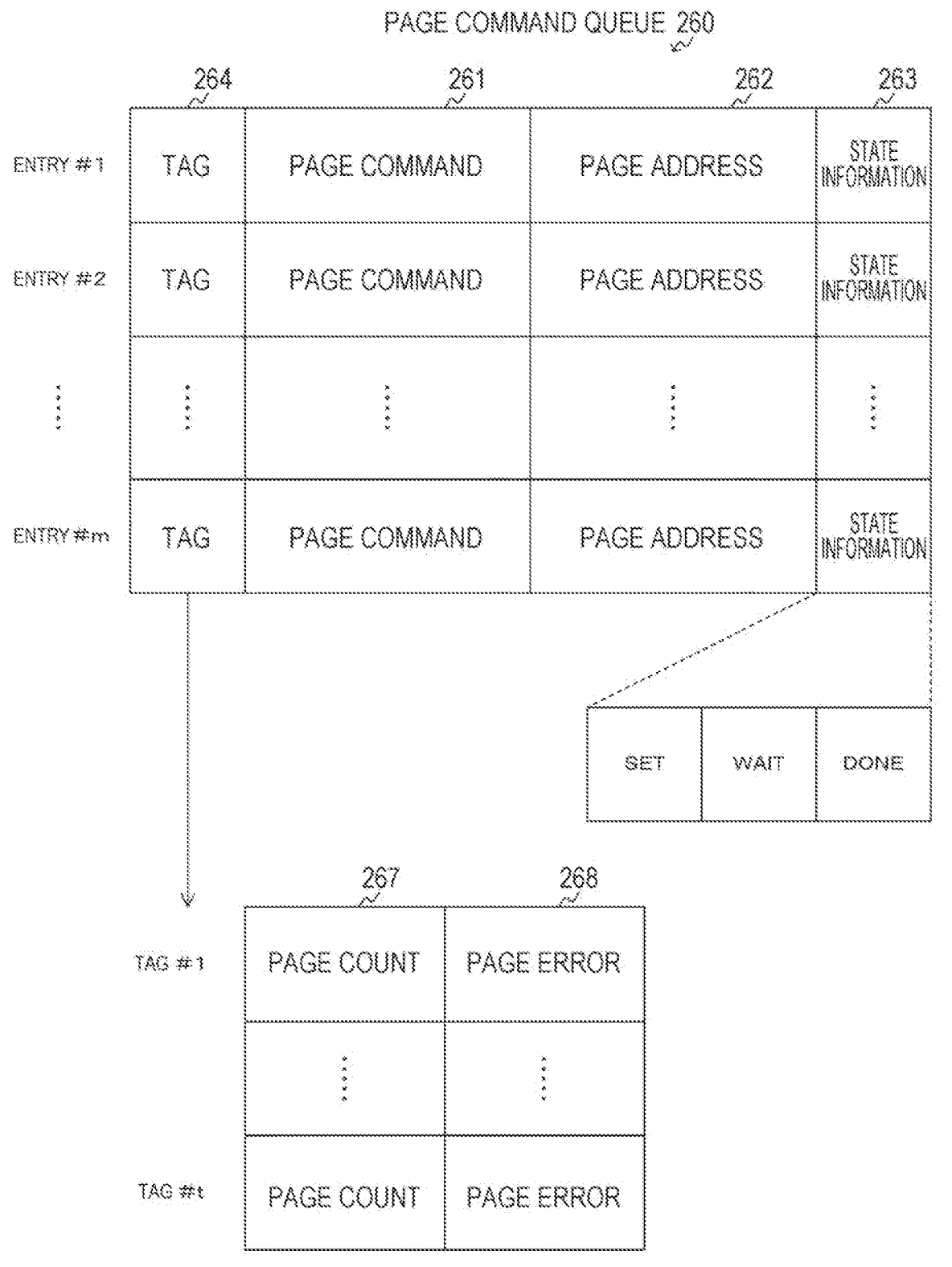

FIG. 20 is a diagram illustrating a configuration example of the page command queue 260 of the second embodiment of the present technology.

Similarly to the first embodiment, the page command queue 260 of the second embodiment includes m number of entries, and associates and holds the page command 261, the page address 262, and the state information 263 in each entry. Then, the page command queue 260 of the second embodiment further associates and holds a tag 264 in each entry. The tag 264 corresponds to the tag 714 of the host command. The same tag is given to page commands corresponding to the same host command, and a different tag is given to a page command corresponding to a different host command. In this way, by referring to the tag given to the page command, it is possible to identify the host command corresponding to the page command.

Furthermore, the page command queue 260 of the second embodiment includes t pairs of the page count 267 and the page error 268. Here, t is an integer of two or more and corresponds to the tag 714 of the host command. Thus, the pairs of the page count 267 and the page error 268 are linked to respective host commands, and the number of completed pages and the number of page errors can be counted with respect to each host command.

[Configuration of Information Processing System]

Here, the operations of the host command reception section 211 and the host command completion transmission section 215 of the second embodiment of the present technology are described. The other sections are similar to those of the first embodiment described above, and a detailed description is omitted.

Figure 21:
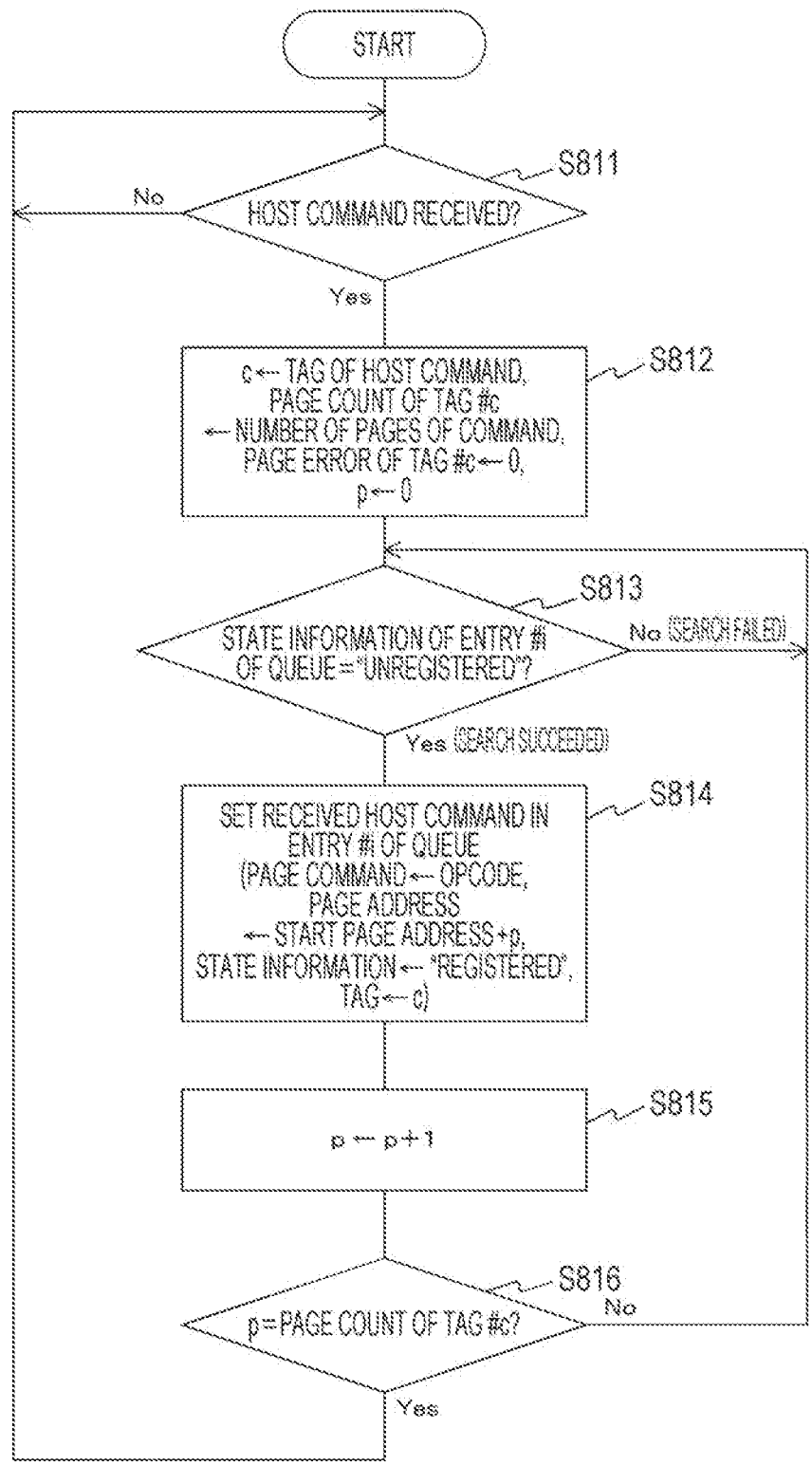
FIG. 21 is a flowchart illustrating an example of a processing sequence of a host command reception section 211 of a second embodiment of the present technology.

FIG. 21 is a flowchart illustrating an example of a processing sequence of the host command reception section 211 of the second embodiment of the present technology.

When the host command reception section 211 receives the host command issued from the host computer 100 (step S811: Yes), the tag 714 of the host command is recognized as a control variable c (step S812). Then, the number of pages 713 of the host command is set in the page count 267 of tag #c of the page command queue 260 (step S812). Furthermore, at this time, the host command reception section 211 sets "0" indicating that a page error has not occurred in the page error 268 of tag #c of the page command queue 260 (step S812). Furthermore, the host command reception section 211 sets initial value "0" in the control variable p used for the processing below (step S812).

The host command reception section 211 searches an entry in which the state information 263 is in the "unregistered" state in the page command queue 260 (step S813). In a case where an entry in the "unregistered" state could not be searched (step S813: No), waiting is made until the entry in the "unregistered" state can newly be searched.

When entry #i in the "unregistered" state is searched (step S813: Yes), the host command reception section 211 divides the received host command into page commands and registers the page commands in entry #i of the page command queue 260 (step S814). In other words, the opcode 711 of the host command is set in the page command 261 of entry #i. Furthermore, a value after the control variable p is added to the start page address 712 of the host command is set in the page address 262 of entry #i. Furthermore, "1-0-0" indicating the "registered" state is set in the state information 263 of entry #i. Furthermore, a value of the control variable c is set in the tag 264 of entry #i.

When one page command is registered in entry #i of the page command queue 260, the host command reception section 211 adds one to the control variable p (step S815). Then, until the control variable p becomes equal to the page count 267 of tag #c of the page command queue 260 (step S816: No), the processing from step S813 onwards is repeated. When the control variable p becomes equal to the page count 267 of tag #c of the page command queue 260 (step S816: Yes), the host command reception section 211 waits for reception of a next host command (step S811).

Figure 22:
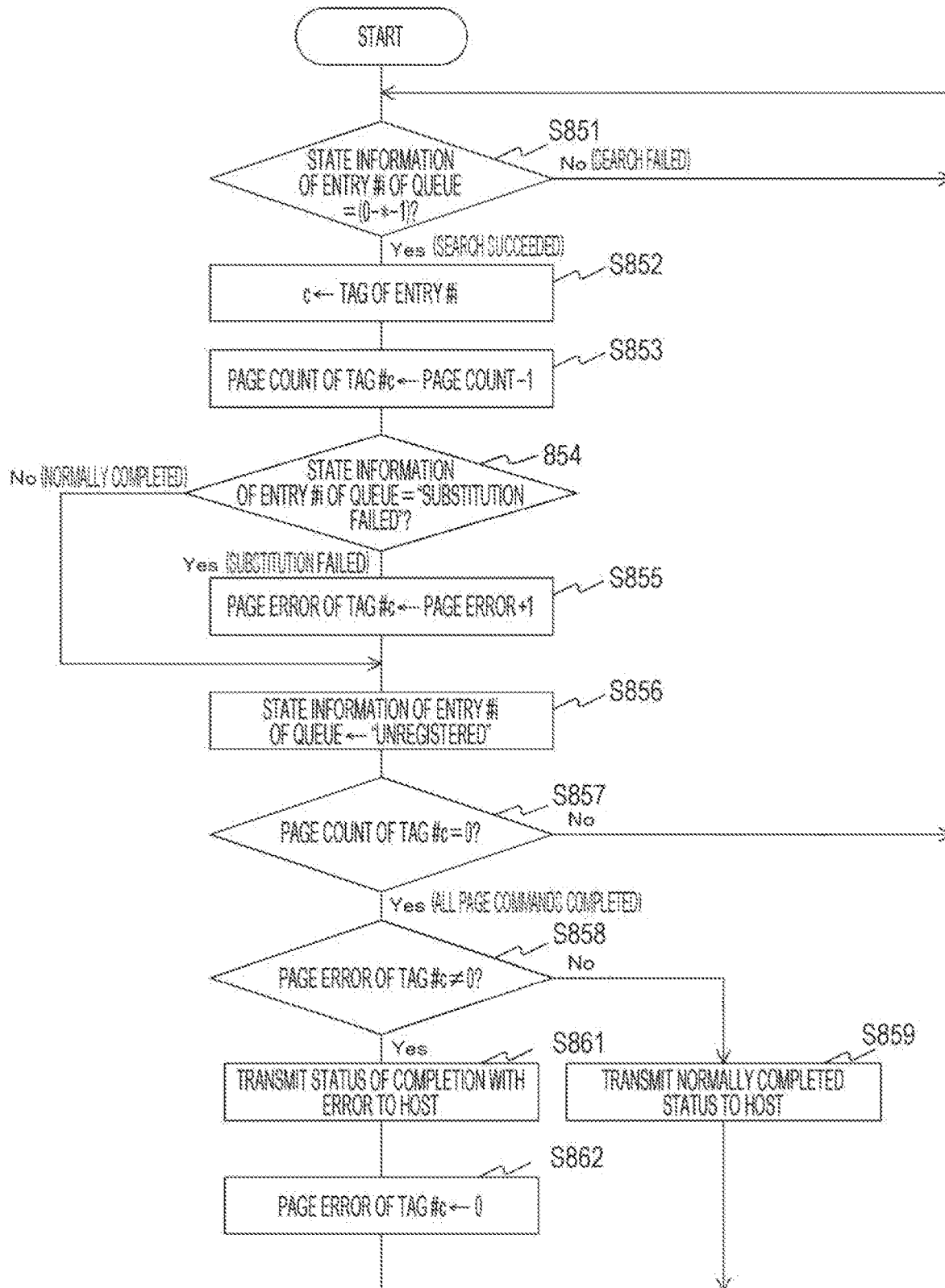
FIG. 22 is a flowchart illustrating an example of a processing sequence of a host command completion transmission section 215 of a second embodiment of the present technology.

FIG. 22 is a flowchart illustrating an example of a processing sequence of the host command completion transmission section 215 of the second embodiment of the present technology.

Similarly to the first embodiment described above, the host command completion transmission section 215 searches entry #i in which the state information 263 is in the completed state "0-*-1" in the page command queue 260 (step S851). In a case where the entry in the completed state could not be searched (step S851: No), waiting is made until an entry in the completed state can newly be searched.

When entry #i in the completed state is searched (step S851: Yes), the tag 264 of entry #i is recognized as the control variable c (step S852). Then, the host command completion transmission section 215 subtracts one from the page count 267 of tag #c of the page command queue 260 (step S853). At this time, in a case where the state information 263 of entry #i indicates the "substitution failed" state (step S854: Yes), the host command completion transmission section 215 adds one to the page error 268 of tag #c of the page command queue 260 (step S855). Then, the host command completion transmission section 215 sets "1-1-1" indicating the "unregistered" state in the state information 263 of entry #i (step S856).

The host command completion transmission section 215 repeats the processing from step S851 onwards when the page count 267 of tag #c of the page command queue 260 is not "0" (step S857: No). When the page count 267 is "0" (step S857: Yes), the host command completion transmission section 215 performs the processing described below on the basis of the assumption that all the page commands corresponding to the host command have been completed.

At this time, when the page error 268 of tag #c of the page command queue 260 is "0" (step S858: No), the host command has been normally completed. Therefore, the host command completion transmission section 215 transmits a status signal indicating normal completion, to the host computer 100 (step S859).

Meanwhile, when the page error 268 of tag #c of the page command queue 260 is not "0" (step S858: Yes), the host command has been completed with error. Therefore, the host command completion transmission section 215 transmits a status signal indicating completion with error, to the host computer 100 (step S861). Then, in preparation of next processing, the page error 268 of tag #c of the page command queue 260 is reset to "0" (step S862).

Thereafter, the host command completion transmission section 215 repeats the processing from step S851 onwards.

[Effects]

Figure 23A:
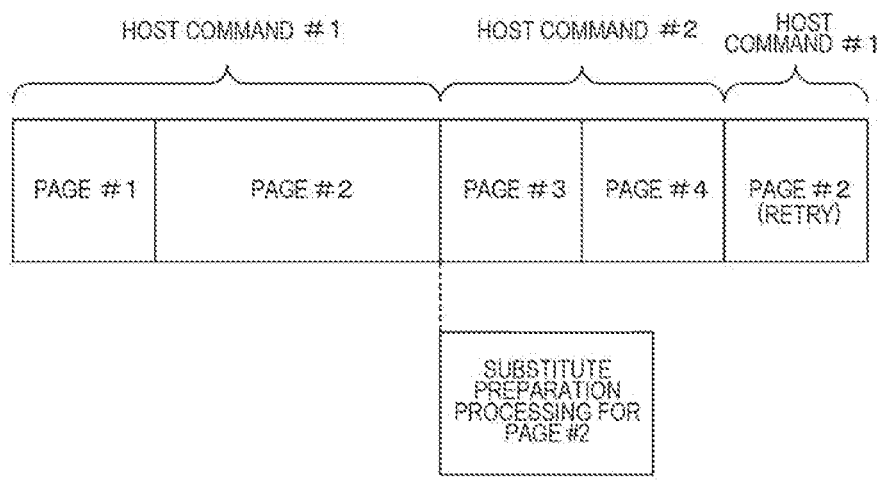
FIGS. 23A and 23B are diagrams illustrating an example of processing timing of an information processing system of a second embodiment of the present technology.
Figure 23B:
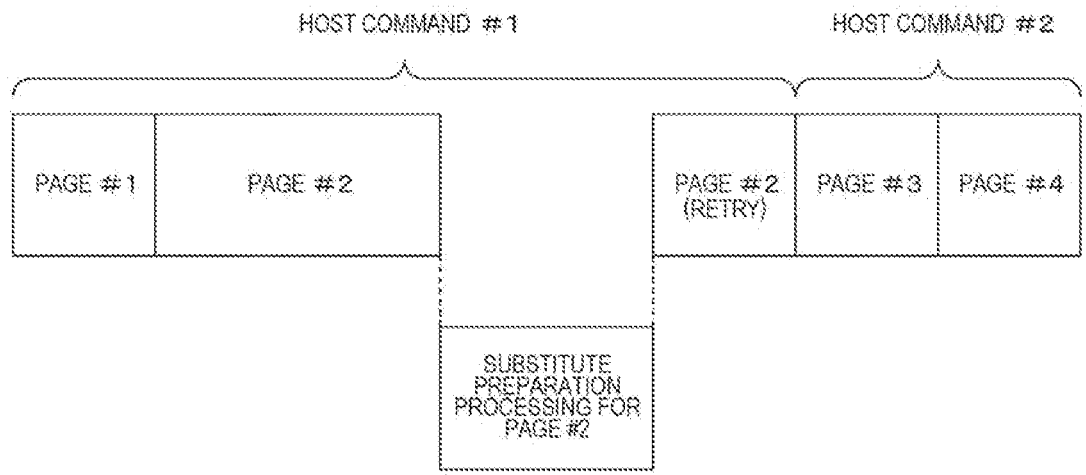

FIGS. 23A and 23B are diagrams illustrating an example of processing timing of the information processing system of the second embodiment of the present technology. In this example, the case is assumed in which when access to the memory 300 is performed in order from page #1, a write error occurs on page #2 and retry is performed on page #2.

In a conventional technology, as illustrated in b of the drawing, retry of page #2 is performed after substitute preparation processing for page #2 and then access to next page #3 is performed continuously. In other words, after completion of host command #1, host command #2 is executed.

In the second embodiment, as illustrated in a of the drawing, when a write error occurs regarding page #2, retry of page #2 is not waited, but access to next page #3 is performed. In other words, access to page #3 by the next page command is executed concurrently with the substitute preparation processing in which the substitute page management table 224 is referenced, a substitute page of page #2 is provided, and a substitution destination page address is set in the substitute address conversion table 222. The access to page #3 is made by the host command #2. However, in the second embodiment, the tag is given with respect to each host command such that a plurality of host commands are mixedly executed. Thus, a delay in association with the preparation processing for a substitute page is concealed over a plurality of host commands such that throughput of the memory 300 during retry can be further increased.

Note that the embodiments described above are examples for embodying the present technology, and matters in the embodiments each have a corresponding relationship with invention-specifying matters in the claims. Similarly, the invention-specifying matters in the claims each have a corresponding relationship with matters in the embodiments of the present technology denoted by the same names. However, the present technology is not limited to the embodiments, and various modifications may be embodied by being made in the embodiments in the scope without departing from the spirit.

Furthermore, the processing sequences described in the embodiments described above may be handled as a method having a series of sequences or may be handled as a program for causing a computer to execute the series of sequences or a recording medium storing the program. As the recording medium, for example, a Compact Disc (CD), a MiniDisc (MD), and a Digital Versatile Disc (DVD), a memory card, a Blu-ray (registered trademark) disc, and the like can be used.

Note that the effects described in the present description are merely illustrative and are not limitative, and other effects may be provided.

Note that the present technology may be configured as below.

(1) A memory controller including:
  a sub-region command holding section that holds a host command issued from a host computer for access to a memory as a sub-region command divided with respect to each access target sub-region;
  a sub-region address conversion section that converts an address of an access target sub-region to an address of the memory regarding the sub-region command held in the sub-region command holding section;
  a sub-region command execution section that executes the sub-region command whose address has been converted, and performs access to the memory; and
  an address conversion management section that performs, in a case where a write error occurs in the memory regarding the sub-region command, preparation processing of a substitute region for the sub-region command in which the write error has occurred concurrently with execution of another sub-region command in the sub-region command execution section.

(2) The memory controller according to (1), further including a sub-region command transmission section that transmits the sub-region command held in the sub-region command holding section to the sub-region command execution section,
  in which the sub-region command holding section holds state information indicating a state up to completion of execution regarding the sub-region command, and
  the sub-region command transmission section transmits the sub-region command to the sub-region command execution section according to the state information.

(3) The memory controller according to (1) or (2), further including a sub-region counter that counts the number of sub-regions up to execution completion regarding the sub-region command held in the sub-region command holding section, and
  a host command completion transmission section that transmits completion of the host command to the host computer when the sub-region command of all sub-regions related to the host command are counted by the sub-region counter.

(4) The memory controller according to (3), further including a sub-region error holding section that holds an error occurrence state regarding the sub-region command held in the sub-region command holding section,
  in which the host command completion transmission section transmits the error occurrence state held in the sub-region error holding section to the host computer.

(5) The memory controller according to (3) or (4), in which the sub-region command holding section further holds a host command identifier that identifies the host command,
  the sub-region counter counts the number of sub-regions with respect to each host command identifier, and
  the host command completion transmission section transmits completion of the host command to the host computer with respect to each host command identifier.

(6) The memory controller according to any of (1) to (5), further including an address conversion table that holds a correspondence relationship between a logical address of the memory and a physical address in the memory in the host computer,
  in which the sub-region address conversion section converts an address of the sub-region command from the logical address to the physical address according to the address conversion table.

(7) The memory controller according to (6), further including a substitute region management table that holds a use state of a substitute region in the memory,
  in which the address conversion management section registers an address of an unused substitute region as the physical address in the address conversion table according to the substitute region management table.

(8) A memory system including:
a memory;
a sub-region command holding section that holds a host command issued from a host computer for access to the memory as a sub-region command divided with respect to each access target sub-region;
a sub-region address conversion section that converts an address of an access target sub-region to an address of the memory regarding the sub-region command held in the sub-region command holding section;
a sub-region command execution section that executes the sub-region command whose address has been converted, and performs access to the memory; and
an address conversion management section that performs, in a case where a write error occurs in the memory regarding the sub-region command, preparation processing of a substitute region for the sub-region command in which the write error has occurred concurrently with execution of another sub-region command in the sub-region command execution section.

(9) An information system including:
a memory;
a host computer that issues a host command for access to the memory;
a sub-region command holding section that holds the host command as a sub-region command divided with respect to each access target sub-region;
a sub-region address conversion section that converts an address of an access target sub-region to an address of the memory regarding the sub-region command held in the sub-region command holding section;
a sub-region command execution section that executes the sub-region command whose address has been converted, and performs access to the memory; and
an address conversion management section that performs, in a case where a write error occurs in the memory regarding the sub-region command, preparation processing of a substitute region for the sub-region command in which the write error has occurred concurrently with execution of another sub-region command in the sub-region command execution section.

(10) A memory control method including:
a sub-region address conversion sequence that converts an address of an access target sub-region to an address of a memory regarding a sub-region command held in a sub-region command holding section that holds a host command issued from a host computer for access to the memory as the sub-region command divided with respect to each access target sub-region;
a sub-region command execution sequence that executes the sub-region command whose address has been converted, and performs access to the memory; and
an address conversion management sequence that performs, in a case where a write error occurs in the memory regarding the sub-region command, preparation processing of a substitute region for the sub-region command in which the write error has occurred concurrently with execution of another sub-region command in the sub-region command execution sequence.

REFERENCE SIGNS LIST

100 Host computer
200 Memory controller
210 Host command conversion section
211 Host command reception section
212 Page command transmission section
214 Page command completion reception section
215 Host command completion transmission section
220 Substitute page address conversion section
221 Page address conversion section
222 Substitute address conversion table
223 Substitute address conversion table management section
224 Substitute page management table
230 Page command execution section
240 Page data transmission section
250 Page data reception section
260 Page command queue
261 Page command
262 Page address
263 State information
264 Tag
267 Page count 268 Page error
300 Memory
400 Memory system
711 Opcode
712 Start page address
713 Number of pages
714 Tag

The invention claimed is:

1. A memory controller, comprising:
a sub-region command holding section that holds a host command issued from a host computer for access to a memory as a first sub-region command divided with respect to each access target sub-region;
a sub-region address conversion section that converts an address of an access target sub-region to an address of the memory regarding the first sub-region command held in the sub-region command holding section;
a sub-region command execution section that executes the first sub-region command whose address has been converted, and performs the access to the memory; and
an address conversion management section that performs, in a case where a write error occurs in the memory regarding the first sub-region command, preparation processing of a substitute region for the first sub-region command in which the write error has occurred concurrently with execution of a second sub-region command in the sub-region command execution section.

2. The memory controller according to claim 1, further comprising
a sub-region command transmission section that transmits the first sub-region command held in the sub-region command holding section to the sub-region command execution section, wherein
the sub-region command holding section holds state information indicating a state up to completion of execution regarding the first sub-region command, and
the sub-region command transmission section transmits the first sub-region command to the sub-region command execution section based on the state information.

3. The memory controller according to claim 1, further comprising:
a sub-region counter that counts a number of sub-regions up to execution completion regarding the first sub-region command held in the sub-region command holding section; and
a host command completion transmission section that transmits completion of the host command to the host computer when the first sub-region command of all sub-regions related to the host command are counted by the sub-region counter.

4. The memory controller according to claim 3, further comprising
a sub-region error holding section that holds an error occurrence state regarding the first sub-region command held in the sub-region command holding section, wherein the host command completion transmission section transmits the error occurrence state held in the sub-region error holding section to the host computer.

5. The memory controller according to claim 3, wherein the sub-region command holding section further holds a host command identifier that identifies the host command,
the sub-region counter counts the number of sub-regions with respect to the host command identifier, and
the host command completion transmission section transmits the completion of the host command to the host computer with respect to the host command identifier.

6. The memory controller according to claim 1, further comprising
an address conversion table that holds a correspondence relationship between a logical address of the memory and a physical address in the memory in the host computer, wherein the sub-region address conversion section converts the address of the first sub-region command from the logical address to the physical address based on the address conversion table.

7. The memory controller according to claim 6, further comprising
a substitute region management table that holds a use state of the substitute region in the memory, wherein the address conversion management section registers an address of an unused substitute region as the physical address in the address conversion table based on the substitute region management table.

8. A memory system, comprising:
a memory;
a sub-region command holding section that holds a host command issued from a host computer for access to the memory as a first sub-region command divided with respect to each access target sub-region;
a sub-region address conversion section that converts an address of an access target sub-region to an address of the memory regarding the first sub-region command held in the sub-region command holding section;
a sub-region command execution section that executes the first sub-region command whose address has been converted, and performs the access to the memory; and
an address conversion management section that performs, in a case where a write error occurs in the memory regarding the first sub-region command, preparation processing of a substitute region for the first sub-region command in which the write error has occurred concurrently with execution of a second sub-region command in the sub-region command execution section.

9. An information system, comprising:
a memory;
a host computer that issues a host command for access to the memory;
a sub-region command holding section that holds the host command as a first sub-region command divided with respect to each access target sub-region;
a sub-region address conversion section that converts an address of an access target sub-region to an address of the memory regarding the first sub-region command held in the sub-region command holding section;
a sub-region command execution section that executes the first sub-region command whose address has been converted, and performs the access to the memory; and
an address conversion management section that performs, in a case where a write error occurs in the memory regarding the first sub-region command, preparation processing of a substitute region for the first sub-region command in which the write error has occurred concurrently with execution of a second sub-region command in the sub-region command execution section.

10. A memory control method, comprising:
converting, by a sub-region address conversion sequence, an address of an access target sub-region to an address of a memory regarding a first sub-region command, wherein the first sub-region command is held in a sub-region command holding section, and the sub-region command holding section holds a host command issued from a host computer for access to the memory as the first sub-region command divided with respect to each access target sub-region;

executing, by a sub-region command execution sequence, the first sub-region command whose address has been converted;

executing, by the sub-region command execution sequence, the access to the memory; and executing, by an address conversion management sequence, in a case where a write error occurs in the memory regarding the first sub-region command, preparation processing of a substitute region for the first sub-region command in which the write error has occurred concurrently with execution of a second sub-region command in the sub-region command execution sequence.

* * * * *